(12) United States Patent
Kim et al.

(10) Patent No.: US 11,729,839 B2
(45) Date of Patent: *Aug. 15, 2023

(54) RANDOM ACCESS CHANNEL SIGNAL TRANSMISSION METHOD AND USER EQUIPMENT, AND RANDOM ACCESS CHANNEL SIGNAL RECEPTION METHOD AND BASE STATION

(71) Applicant: LG Electronics Inc., Seoul (KR)

(72) Inventors: Eunsun Kim, Seoul (KR); Kijun Kim, Seoul (KR); Hyunsoo Ko, Seoul (KR); Suckchel Yang, Seoul (KR); Yunjung Yi, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,001

(22) Filed: Feb. 4, 2022

(65) Prior Publication Data

US 2022/0159719 A1    May 19, 2022

Related U.S. Application Data

(63) Continuation of application No. 16/084,091, filed as application No. PCT/KR2017/002250 on Mar. 2, 2017, now Pat. No. 11,291,055.
(Continued)

(51) Int. Cl.
*H04W 74/08* (2009.01)
*H04W 48/10* (2009.01)
(Continued)

(52) U.S. Cl.
CPC ......... *H04W 74/085* (2013.01); *H04W 48/10* (2013.01); *H04W 48/14* (2013.01);
(Continued)

(58) Field of Classification Search
CPC ... H04W 74/085; H04W 48/10; H04W 48/14; H04W 56/001; H04W 74/008; H04W 74/0833
See application file for complete search history.

(56) References Cited

U.S. PATENT DOCUMENTS 11,291,055 B2 * 3/2022 Kim .................. H04W 72/0453
2008/0310396 A1 * 12/2008 Park .................. H04W 56/0005
370/329
(Continued)

FOREIGN PATENT DOCUMENTS

KR   1020110083547   7/2011
KR   1020110113897   10/2011
(Continued)

OTHER PUBLICATIONS

Extended European Search Report in European Appln. No. 17763500.0, dated Mar. 22, 2022, 9 pages.
(Continued)

*Primary Examiner* — Jael M Ulysse
(74) *Attorney, Agent, or Firm* — Fish & Richardson P.C.

(57) ABSTRACT

In a wireless communication system according to the present invention, a plurality of synchronization signals may be transmitted on a cell. The plurality of synchronization signals may be respectively associated with a plurality of random access channel establishments. A user equipment may receive at least one of the plurality of synchronization signals. The user equipment may transmit a random access channel using a random access channel.

16 Claims, 14 Drawing Sheets

Related U.S. Application Data

(60) Provisional application No. 62/441,573, filed on Jan. 3, 2017, provisional application No. 62/349,078, filed on Jun. 12, 2016, provisional application No. 62/333,290, filed on May 9, 2016, provisional application No. 62/310,795, filed on Mar. 20, 2016, provisional application No. 62/307,319, filed on Mar. 11, 2016.

(51) Int. Cl.
*H04W 56/00* (2009.01)
*H04W 74/00* (2009.01)
*H04W 48/14* (2009.01)
*H04W 72/0446* (2023.01)
*H04W 72/0453* (2023.01)
*H04W 72/30* (2023.01)

(52) U.S. Cl.
CPC ..... *H04W 56/001* (2013.01); *H04W 56/0015* (2013.01); *H04W 72/0446* (2013.01); *H04W 72/0453* (2013.01); *H04W 72/30* (2023.01); *H04W 74/006* (2013.01); *H04W 74/008* (2013.01); *H04W 74/0833* (2013.01)

(56) References Cited

U.S. PATENT DOCUMENTS

| | | | | |
|---|---|---|---|---|
| 2009/0316631 A1* | 12/2009 | Kato | ............. | H04L 27/2692 370/328 |
| 2011/0039499 A1* | 2/2011 | Zhang | ............. | H04W 74/0833 455/67.11 |
| 2011/0292824 A1* | 12/2011 | Uemura | ............. | H04B 7/2678 370/252 |
| 2012/0039284 A1* | 2/2012 | Barbieri | ............. | H04W 48/10 370/329 |
| 2012/0113939 A1* | 5/2012 | Kim | ............. | H04W 74/006 370/329 |
| 2012/0188961 A1* | 7/2012 | Suzuki | ............. | H04W 74/0833 370/329 |
| 2013/0010715 A1* | 1/2013 | Dinan | ............. | H04L 5/0053 370/329 |
| 2013/0188580 A1* | 7/2013 | Dinan | ............. | H04W 74/006 370/329 |
| 2013/0223409 A1* | 8/2013 | Jung | ............. | H04W 36/20 370/331 |
| 2013/0242951 A1* | 9/2013 | Lee | ............. | H04W 56/0045 370/336 |
| 2014/0169361 A1* | 6/2014 | Kim | ............. | H04L 5/0048 370/350 |
| 2014/0349645 A1* | 11/2014 | Webb | ............. | H04W 52/0206 455/435.1 |
| 2014/0355539 A1* | 12/2014 | Yang | ............. | H04L 1/1893 370/329 |
| 2015/0078330 A1* | 3/2015 | Nakao | ............. | H04W 72/51 370/330 |
| 2016/0006529 A1 | 1/2016 | Yi et al. | | |
| 2016/0044584 A1* | 2/2016 | Jung | ............. | H04W 48/14 370/330 |
| 2016/0066255 A1* | 3/2016 | Marinier | ............. | H04W 56/001 370/350 |
| 2016/0105860 A1* | 4/2016 | Li | ............. | H04W 72/30 370/350 |
| 2016/0157194 A1* | 6/2016 | Svedman | ............. | H04B 7/2656 370/350 |
| 2016/0302090 A1* | 10/2016 | Parkvall | ............. | H04B 7/0695 |
| 2016/0323757 A1* | 11/2016 | Braun | ............. | H04B 7/088 |
| 2017/0048810 A1* | 2/2017 | Sahlin | ............. | H04L 27/26 |
| 2017/0111886 A1* | 4/2017 | Kim | ............. | H04W 48/14 |
| 2017/0251460 A1 | 8/2017 | Agiwal et al. | | |
| 2017/0251500 A1 | 8/2017 | Agiwal et al. | | |
| 2017/0289910 A1* | 10/2017 | Islam | ............. | H04W 52/0216 |
| 2018/0310235 A1 | 10/2018 | You et al. | | |
| 2018/0317159 A1* | 11/2018 | Frenger | ............. | H04W 56/001 |
| 2019/0150069 A1 | 5/2019 | Mustapha | | |
| 2020/0107248 A1 | 4/2020 | Brismar et al. | | |

FOREIGN PATENT DOCUMENTS

| | | |
|---|---|---|
| KR | 1020140003633 | 1/2014 |
| WO | WO2012057531 | 5/2012 |
| WO | WO2012150809 | 8/2012 |
| WO | WO2014042468 | 3/2014 |
| WO | WO2015025839 | 2/2015 |
| WO | WO2015080649 | 6/2015 |
| WO | WO2015122715 | 8/2015 |

OTHER PUBLICATIONS

NEC, "LTE BCH-on-demand," R2-062930, TSG-RAN Working Group2#55, Oct. 9-13, 2006, 5 pages.
CATT, "Transfer mechanism of system information," R2-070112, 3GPP TSG-RAN WG2#56bis, Sorrento, Italy, Jan. 15-19, 2007, 5 pages, XP050133225.
European Office Action in European Appln. No. 17763500.0, dated Jul. 27, 2020, 5 pages.
Extended European Search Report in European Appln. No. 17763500.0, dated Jul. 17, 2019, 7 pages.
International Search Report in International Appln. No. PCT/KR2017/002243, dated Jun. 8, 2017, 17 pages (with English translation).
International Search Report in International Appln. No. PCT/KR2017/002250, dated Jun. 16, 2017, 18 pages (with English translation).
NEC, "Further clarification of on-demand S-BCH," R2-063090, TSG-RAN Working Group 2#56, Nov. 6-10, 2006, Riga, Latvia, 5 pages, XP050132601.
Nortel, "System Information broadcast gating," R2-063137, 3GPP TSG RAN WG2#56, Riga, Latvia, dated Nov. 6-10, 2006, 5 pages, XP050132644.
Office Action in U.S. Appl. No. 16/084,078, dated Apr. 29, 2021, 9 pages.
Office Action in U.S. Appl. No. 16/084,078, dated Oct. 27, 2020, 18 pages.

* cited by examiner

FIG. 13A

| Beam index A | RAR | Beam index A | RAR | Beam index B | RAR | ... |

FIG. 13B

| Beam index A | RAR1 | RAR2 | ... | Beam index B | RAR1 | RAR2 | ... |

RANDOM ACCESS CHANNEL SIGNAL TRANSMISSION METHOD AND USER EQUIPMENT, AND RANDOM ACCESS CHANNEL SIGNAL RECEPTION METHOD AND BASE STATION

CROSS-REFERENCE TO RELATED APPLICATIONS

This application is a continuation of U.S. application Ser. No. 16/084,091, filed on Sep. 11, 2018, which is a National Stage application under 35 U.S.C. § 371 of International Application No. PCT/KR2017/002250, filed on Mar. 2, 2017, which claims the benefit of U.S. Provisional Application No. 62/441,573, filed on Jan. 3, 2017, U.S. Provisional Application No. 62/349,078, filed on Jun. 12, 2016, U.S. Provisional Application No. 62/333,290, filed on May 9, 2016, U.S. Provisional Application No. 62/310,795, filed on Mar. 20, 2016, and U.S. Provisional Application No. 62/307,319, filed on Mar. 11, 2016. The disclosures of the prior applications are incorporated by reference in their entirety.

TECHNICAL FIELD

The present invention relates to a wireless communication system, and more particularly, to methods and devices for transmitting/receiving random access channel signal.

BACKGROUND

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

SUMMARY

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

In a wireless communication system according to the present invention, a plurality of synchronization signals may be transmitted on a cell. The plurality of synchronization signals may be respectively associated with a plurality of random access channel configurations. A user equipment may receive at least one of the plurality of synchronization signals. The user equipment may transmit a random access channel using a random access channel configuration associated with a synchronization signal that the user equipment received.

In an aspect of the present invention, provided herein is a method for transmitting a random access channel signal by a user equipment (UE). The method comprises: receiving a synchronization signal of a cell; synchronizing with the cell using the synchronization signal; and transmitting a random access channel over the cell. The cell may include a plurality of synchronization signals. The plurality of synchronization signals may be respectively related to a plurality of random access channel configurations. The random access channel may be transmitted using a random access channel configuration related to the synchronization signal among the plurality of random access channel configurations.

In another aspect of the present invention, provided herein is a method for receiving a random access channel signal by a base station (BS). the method comprises: transmitting a plurality of synchronization signals over a cell; and receiving a random access channel of a user equipment (UE) on the cell. The plurality of synchronization signals may be respectively related to a plurality of random access channel configurations. The random access channel of the UE may be received using one among the plurality of random access channel configurations.

In a further aspect of the present invention, provided herein is a user equipment (UE) for transmitting a random access channel signal. The UE may include a radio frequency (RF) unit and a processor configured to control the RF unit. The processor may be configured to: control the RF unit to receive a synchronization signal of a cell; synchronize with the cell using the synchronization signal; and control the RF unit to transmit a random access channel over the cell. The cell may include a plurality of synchronization signals. The plurality of synchronization signals may be respectively related to a plurality of random access channel configurations. the processor may be configured to control the RF unit to transmit the random access channel using a random access channel configuration related to the synchronization signal among the plurality of random access channel configurations.

In still another aspect of the present invention, provided herein is a base station (BS) for receiving a random access channel signal. The BS may include a radio frequency (RF) unit and a processor configured to control the RF unit. The processor may be configured to: control the RF unit to transmit a plurality of synchronization signals over a cell; and control the RF unit to receive a random access channel of a user equipment (UE) on the cell. The plurality of synchronization signals may be respectively related to a plurality of random access channel configurations. The random access channel of the UE may be received using one among the plurality of random access channel configurations.

In each aspect of the present invention, configuration information indicating the random access channel configuration related to the synchronization signal may be transmitted by the BS or received by the UE.

In each aspect of the present invention, the configuration information may be included in in system information related to the synchronization signal to be transmitted by the BS or to be received by the UE.

In each aspect of the present invention, the plurality of synchronization signals may be distinguished by different indices other than a frame index, a subframe index and a symbol index.

In each aspect of the present invention, a random access response may be received by the UE or transmitted by the BS in response to the random access channel. A downlink channel may be transmitted by the BS or received by the UE using an index indicated by the random access response among the different indices. An uplink channel may be received by the BS or transmitted by the UE using an index indicated by the random access response among the different indices.

The above technical solutions are merely some parts of the embodiments of the present invention and various embodiments into which the technical features of the present invention are incorporated can be derived and understood by persons skilled in the art from the following detailed description of the present invention.

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIGS. 13A and 13B illustrate random access response (RAR) message formats according to the present invention.

DETAILED DESCRIPTION

Figure 1A:
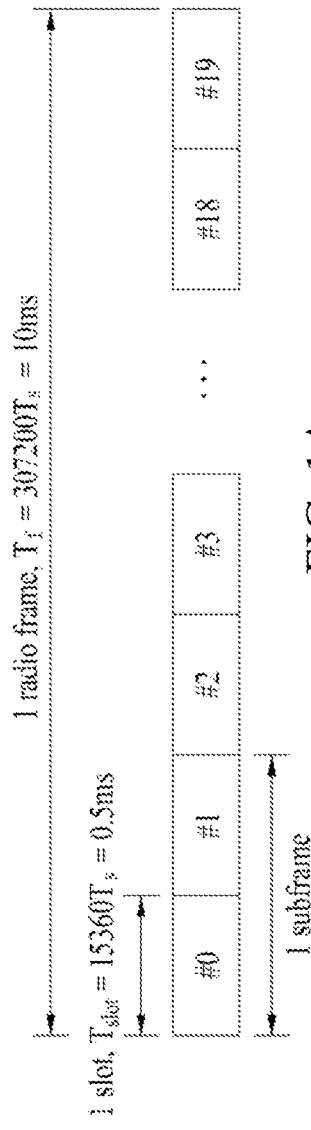
FIGS. 1A and 1B illustrate the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE- RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

Figure 1B:
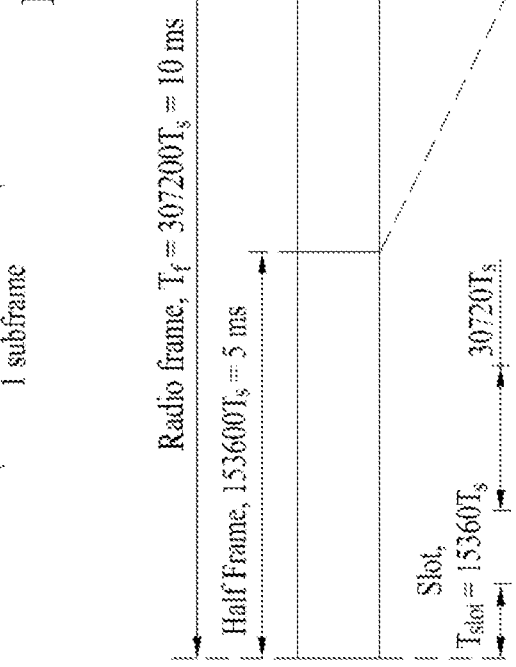

FIGS. 1A and 1B illustrate the structure of a radio frame used in a wireless communication system.

Specifically, FIG. 1A illustrates an exemplary structure of a radio frame which can be used in frequency division multiplexing (FDD) in 3GPP LTE/LTE-A and FIG. 1B illustrates an exemplary structure of a radio frame which can be used in time division multiplexing (TDD) in 3GPP LTE/LTE-A.

Referring to FIGS. 1A and 1B, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, Ts denotes sampling time where $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
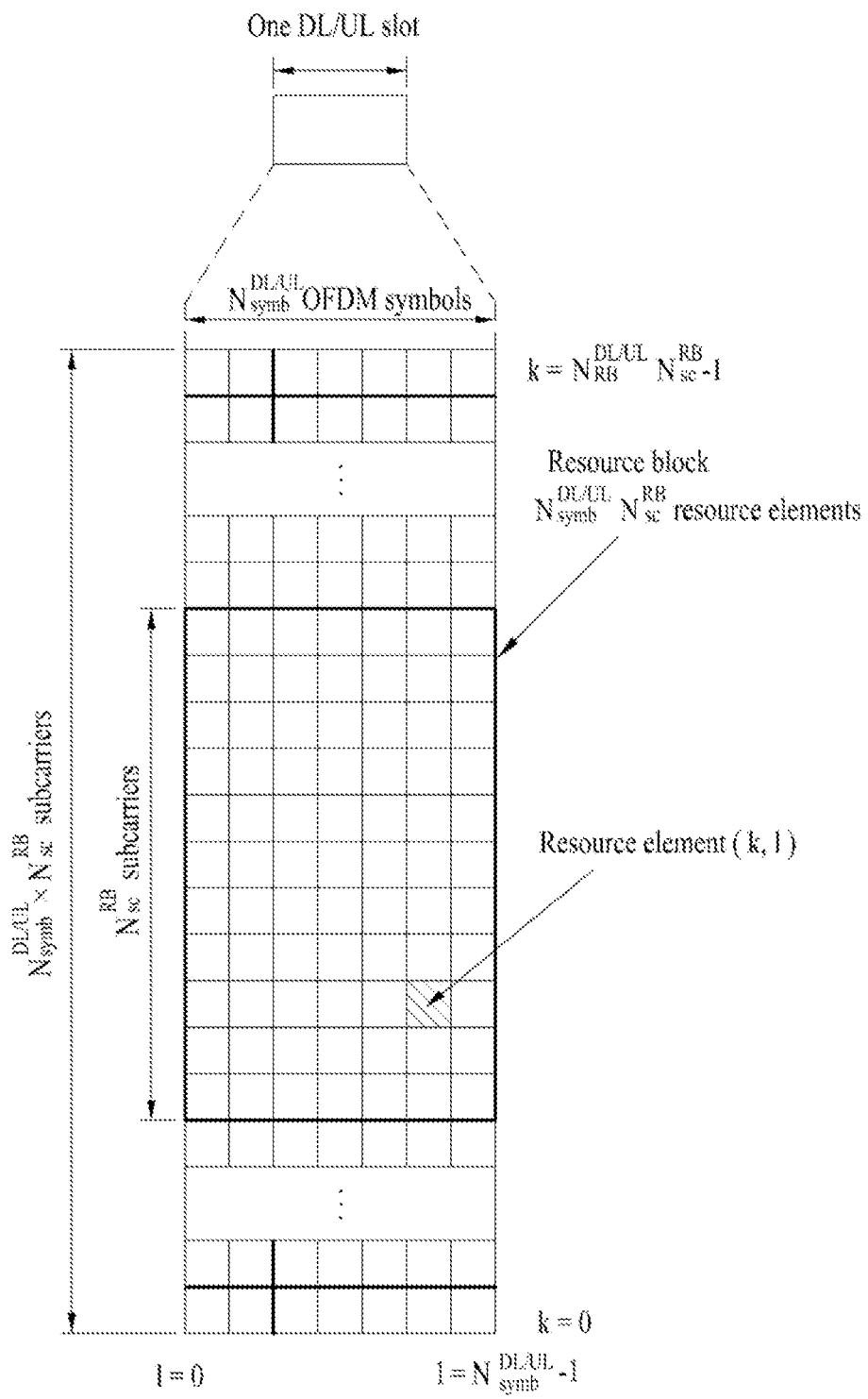
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3A:
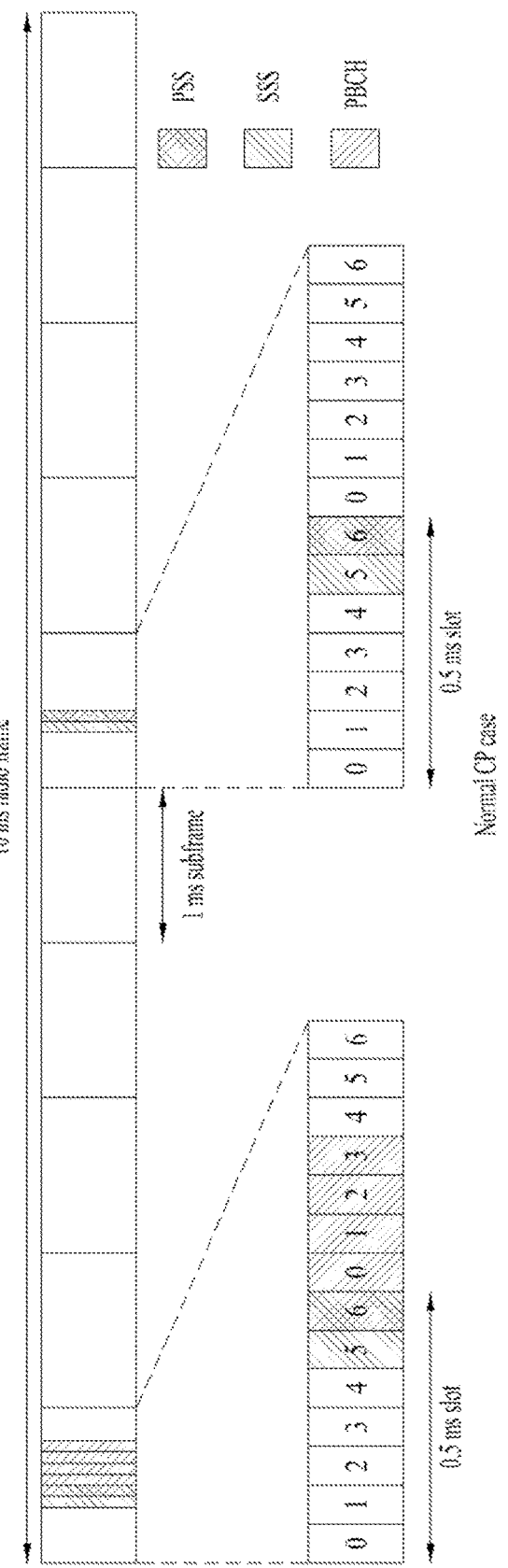
FIGS. 3A and 3B illustrate a radio frame structure for transmission of a synchronization signal (SS) slot in the LTE/LTE-A based wireless communication system.
Figure 3B:
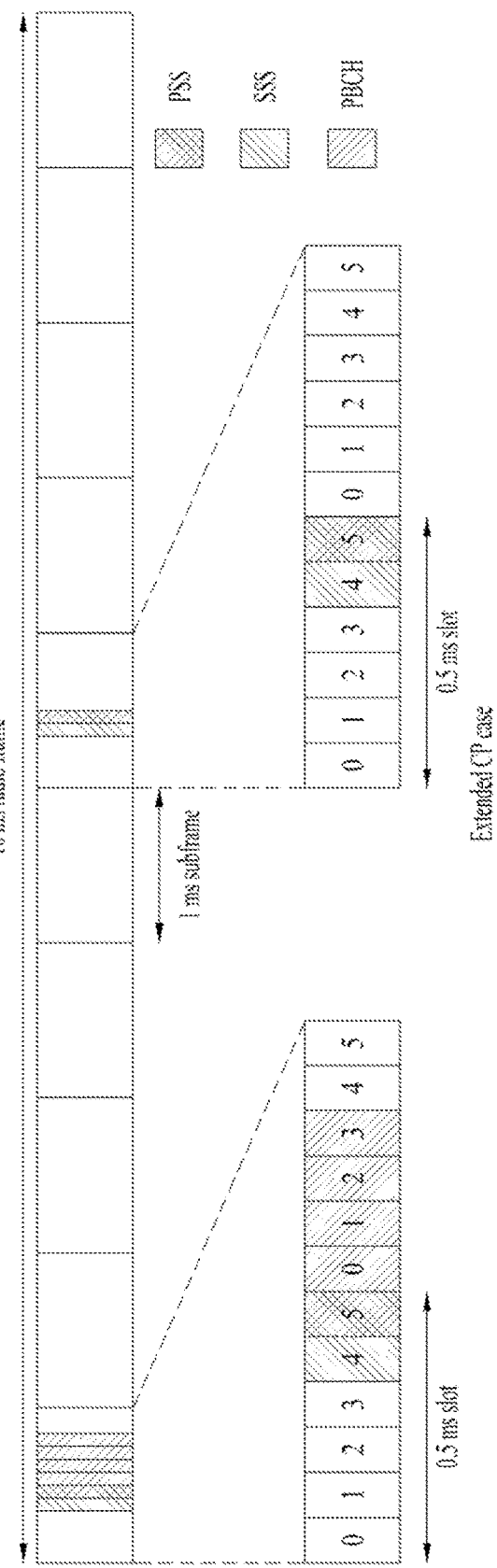

FIGS. 3A and 3B illustrate a radio frame structure for transmission of a synchronization signal (SS) in the LTE/LTE-A based wireless communication system. Specifically, FIGS. 3A and 3B illustrate a radio frame structure for transmission of an SS and a PBCH in frequency division duplex (FDD), wherein FIG. 3A illustrates transmission locations of an SS and a PBCH in a radio frame configured as a normal cyclic prefix (CP) and FIG. 3B illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIGS. 3A and 3B. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIGS. 3A and 3B, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIGS. 3A and 3B, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and may be categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDCCH/PDSCH reception and PUSCH/PUCCH transmission as general uplink/downlink transmission procedures.

The random access procedure is also referred to as a random access channel (RACH) procedure. The random access procedure is used for various purposes including initial access, adjustment of UL synchronization, resource assignment, and handover. Random access procedures are categorized into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible for multiple UEs to transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without collision with other UEs.

The contention-based random access procedure includes the following four steps. Messages transmitted in Steps 1 to 4 given below may be referred to as Msg1 to Msg4.

Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling
Step 1: RACH preamble (via PRACH) (from UE to eNB)
Step 2: RAR (via PDCCH and PDSCH) (from eNB to UE)

After transmitting the RACH preamble, the UE attempts to receive an RAR within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

A random access preamble, i.e., a RACH preamble consists of a cyclic prefix (CP) having a length of $T_{CP}$ and a sequence part having a length of $T_{SEQ}$. $T_{CP}$ and $T_{SEQ}$ depend on a frame structure and a random access configuration, and preamble formats are controlled by higher layers. The RACH preamble is transmitted in a UL subframe. Transmission of random access preambles is restricted to be performed on certain time and frequency resources. Such a resource is referred to as a PRACH resource. PRACH resources are numbered as the subframe number increases in a radio frame and the RPB number increases in the frequency domain so that index 0 may correspond to the lowest PRB and subframe in the radio frame. In addition, random access resources are defined according to a PRACH configuration index (cf. 3GPP TS 36.211). The PRACH configuration index is provided through a higher layer signal (transmitted from an eNB).

Figure 4:
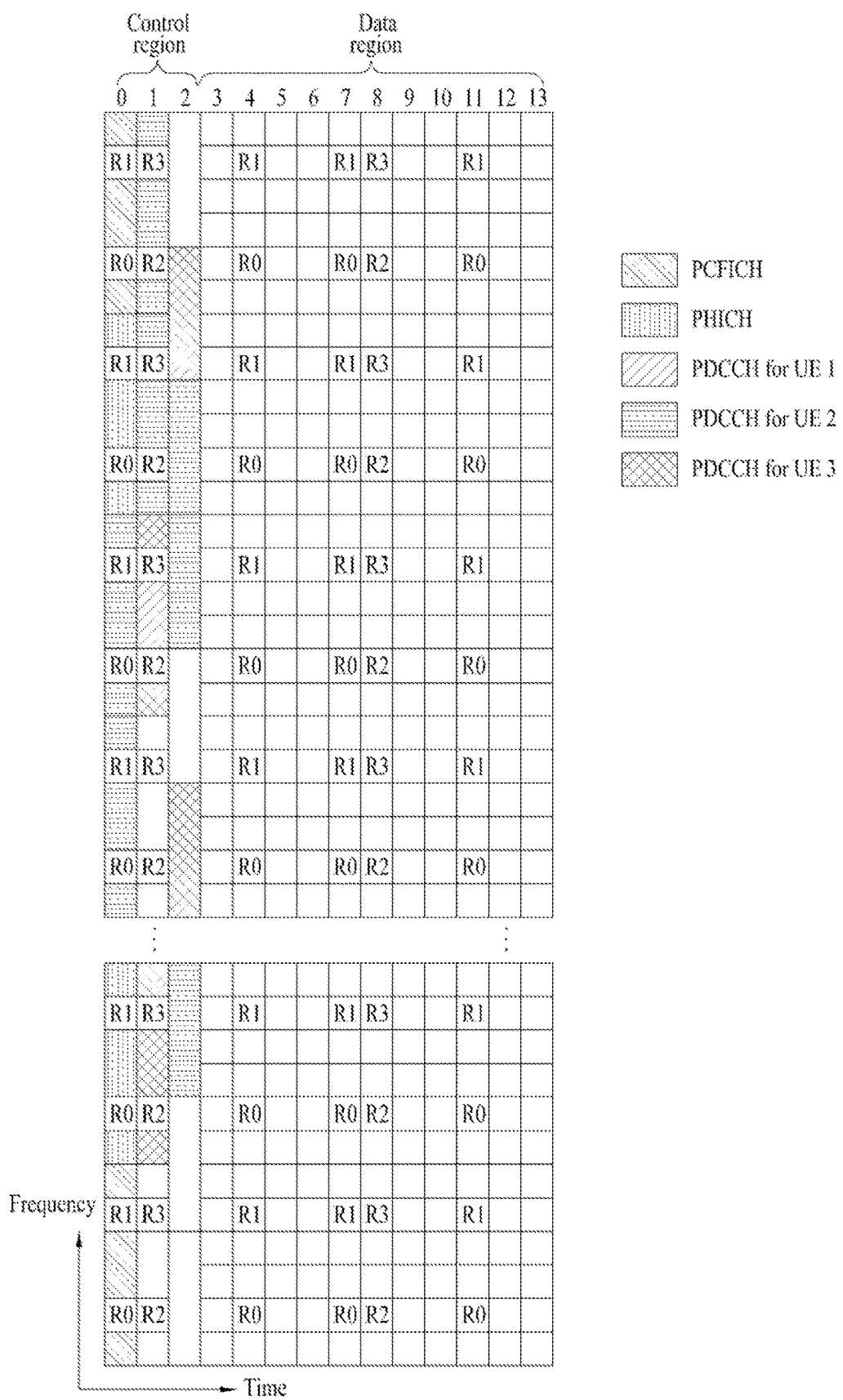
FIG. 4 illustrates the structure of a DL subframe used in the LTE/LTE-A based wireless communication system.

FIG. 4 illustrates the structure of a DL subframe used in the LTE/LTE-A based wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Figure 5:
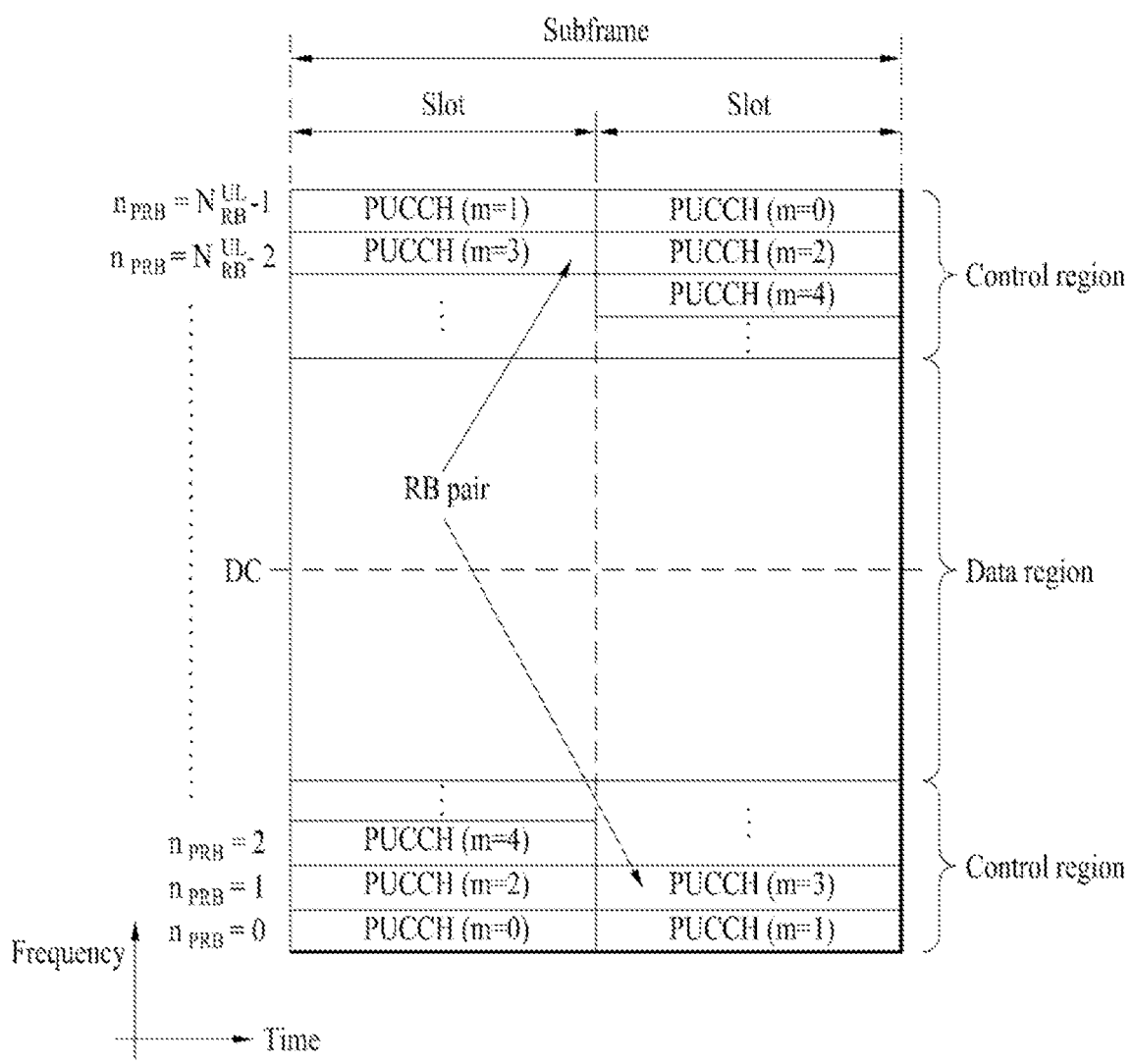
FIG. 5 illustrates the structure of a UL subframe used in the LTE/LTE-A based wireless communication system.

FIG. 5 illustrates the structure of a UL subframe used in the LTE/LTE-A based wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. ADC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 6:
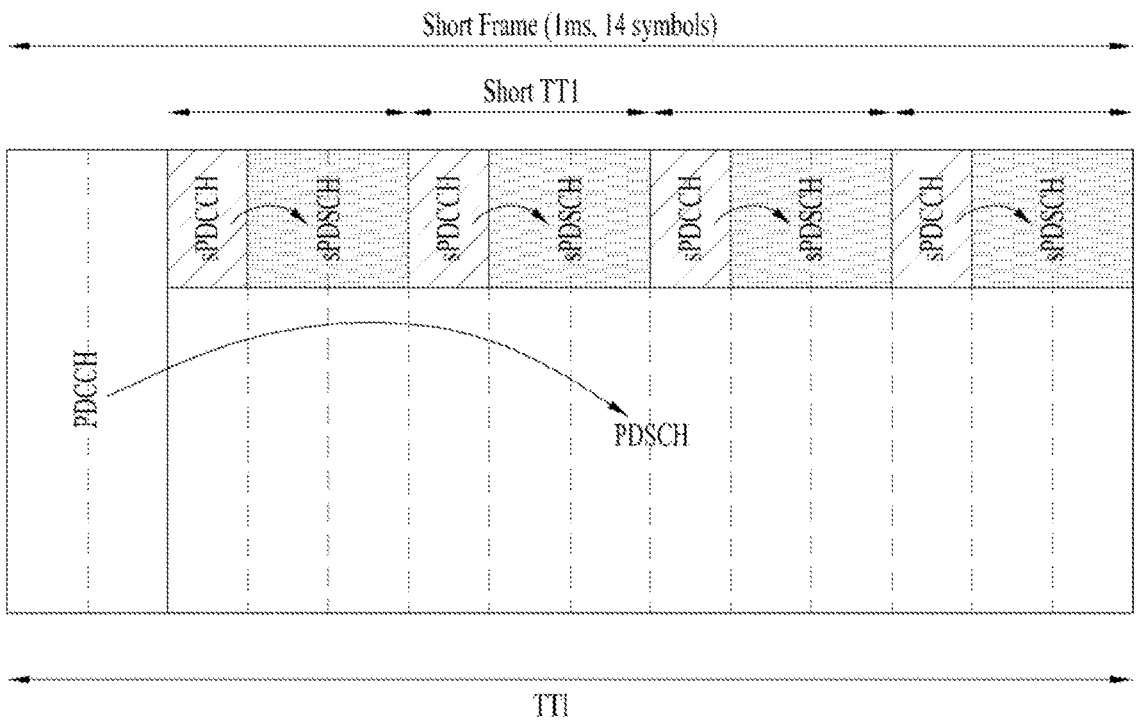
FIG. 6 illustrates an example of a short transmission time interval (TTI) and a transmission example of a control channel and a data channel in the short TTI.

FIG. 6 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 6, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

<OFDM Numerology>

The new RAT system uses an OFDM transmission scheme or a similar transmission scheme. For example, the new RAT system may follow the OFDM parameters defined in the following table.

TABLE 1

| Parameter | Value |
| --- | --- |
| Subcarrier-spacing (Δf) | 75 kHz |
| OFDM symbol length | 13.33 us |
| Cyclic Prefix(CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Figure 7:
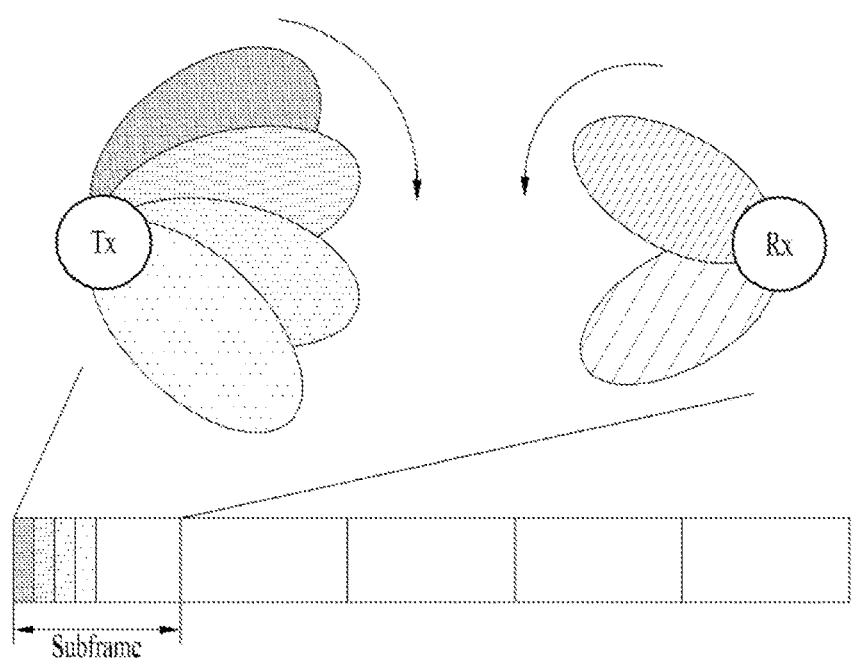
FIG. 7 illustrates an application example of analog beamforming.

FIG. 7 shows an example where analog beamforming is applied.

Referring to FIG. 7, it is possible to transmit/receive signals by changing beam directions over time.

The present invention describes an initial access procedure in the mmWave system, which is different from the conventional one due to the analog beamforming features. In addition, the present invention proposes not only how a UE and an eNB operate according to the changed initial access procedure but signaling information that should be exchanged between the UE and eNB and a method therefor.

<Self-Contained Subframe Structure>

Figure 8:
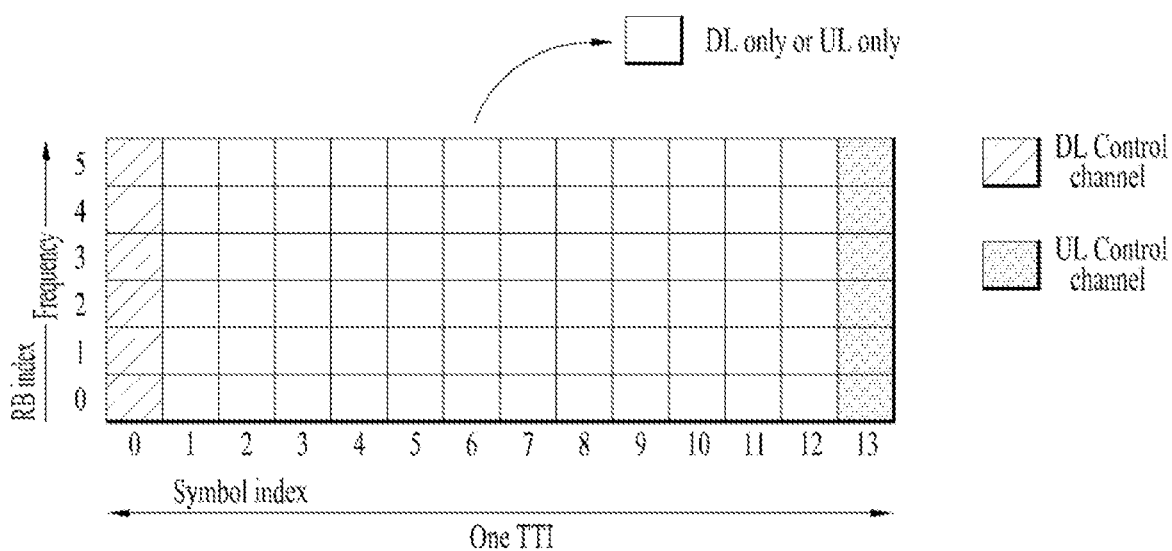
FIG. 8 illustrates a self-contained subframe structure.

FIG. 8 illustrates a self-contained subframe structure.

In order to minimize the latency of data transmission in the TDD system, a self-contained subframe structure is considered in the new fifth-generation RAT.

In FIG. 8, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 8, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

Referring to FIG. 8, in a wideband system, a DL control channel can be Time Division Multiplexed (TDMed) with DL data or UL data and then transmitted. In this case, although an eNB may transmit a DL control channel(s) over the entire band, but one UE may receive its DL control channel in specific partial band rather than the entire band. In this case, the DL control channel corresponding to information transmitted from the eNB to the UE may contain not only DL specific information such as DL scheduling but also information on a cell configuration and UL specific information such as UL grant.

For example, it is expected that the new RAT system, which is called the mmWave system or 5G system, will use wide system bandwidth. Specifically, depending on the frequency band, the minimum system bandwidth of 5 MHz, 10 MHz, 40 MHz, 80 MHz, etc. should be able to be supported. The minimum system band may vary according to the basic subcarrier spacing. For example, when the basic subcarrier spacing is respectively set to 15 kHz, 30 kHz, 120 kHz, and 240 kHz, the minimum system band may be 5 MHz, 10 MHz, 40 MHz, and 80 MHz, respectively. For example, the new RAT system is designed such that it operates on not only 6 GHz or less but 6 GHz or more and a plurality of subcarriers are used in one system to support various scenarios and use cases. When the length of a subcarrier is changed, the length of a subframe can increase/decrease according to the change in the subcarrier length. For example, one subframe may be defined to have a short time period, for example, 0.5 ms, 0.25 ms, 0.125 ms, etc. It is expected that the new RAT system will use high frequency band (e.g., 6 GHz or higher) and support a subcarrier spacing greater than 15 kHz, i.e., the subcarrier spacing of the conventional LTE system. For example, assuming that the subcarrier spacing is 60 kHz, one resource unit (RU) can be defined as twelve subcarriers in the frequency domain and one subframe in the time domain.

To be associated with and served by a specific system, a UE should first perform the following operations. The UE should obtain the time and frequency synchronization of the corresponding system, receive basic System Information (SI), and adjust its uplink timing. In general, such a procedure is referred to as an initial access procedure, and the initial access procedure includes a synchronization procedure and an RACH procedure (i.e., random access procedure). Hereinafter, the above-mentioned synchronization procedure of the LTE system is briefly summarized for convenience of description.

>PSS: Symbol timing acquisition, frequency synchronization, and cell ID detection within cell ID group (3 hypotheses).

>SSS: cell ID group detection (168 hypotheses), 10-ms frame boundary detection, and cyclic prefix (CP) detection (2 hypotheses).

>PBCH decoding: antenna configuration, 40-ms timing detection, system information, system bandwidth, etc.

That is, a UE obtains OFDM symbol timing and subframe timing as well as a cell ID based on a PSS and an SSS, performs descrambling and decoding of a PBCH using the cell ID, and then obtains important information of the corresponding system. The basic synchronization procedure of the mmWave or new RAT system (hereinafter referred to as the mmWave/new RAT system) is similar to the above-described procedure, but the PSS/SSS transmission/reception method of the mmWave/new RAT system is significantly different from the conventional one.

Figure 9A:
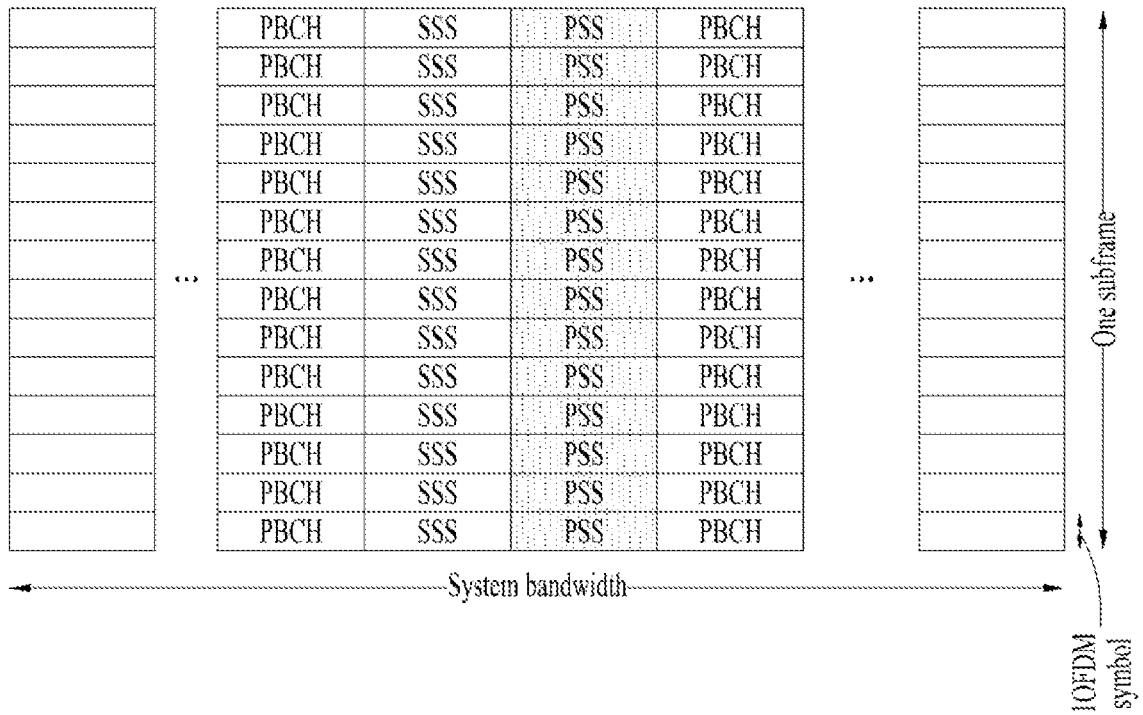
FIGS. 9A and 9B illustrate examples of the time periods and resource regions of the new system where primary synchronization signal (PSS)/secondary synchronization signal (SSS)/physical broadcast channel (PBCH) are transmitted.
Figure 9B:
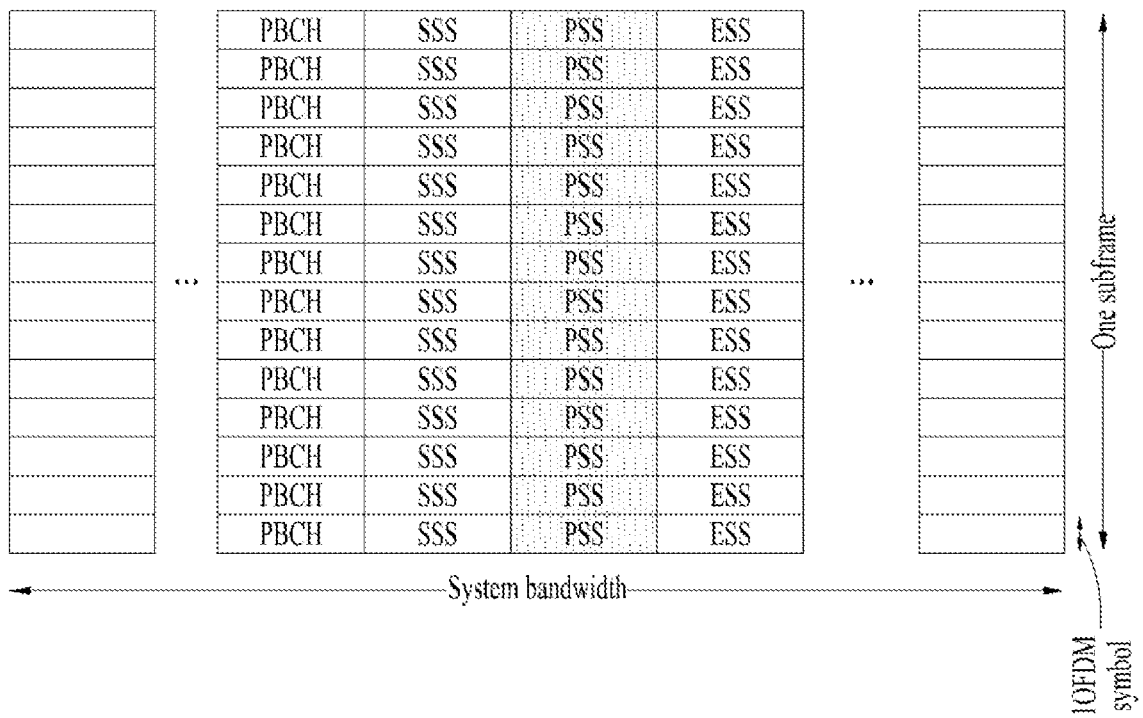

FIGS. 9A and 9B illustrate examples of the time periods and resource regions of the new system where PSS/SSS/PBCH are transmitted. Specifically, FIG. 9A shows an example of the PSS/SSS/PBCH transmission period, and FIG. 9B shows an example of the PSS/SSS/ESS/PBCH transmission period.

Referring to FIGS. 9A and 9B, when one subframe consists of 14 OFDM symbols, PSS/SSS/PBCH can be transmitted in different directions per OFDM symbol. The number of beam directions can be selected within the range of 1 to N. In addition, the number of beams (or beam directions) can be dynamically determined according to frequency or by considering cell interference. When detecting a PSS, a UE can obtain symbol synchronization and a physical cell ID. Alternatively, the UE can obtain a cell ID by detecting a PSS and an SSS.

In the LTE/LTE-A system, PSS/SSS have been transmitted omni-directionally, whereas, in the mmWave system, a method by which an eNB performs beamforming by rotating beam directions omni-directionally to transmit signals such as PSS/SSS/PBCH has been considered. That is, beam sweeping or beam scanning means transmitting and receiving signals by rotating beam directions as described above. For example, assuming that an eNB can support or have a maximum of N beam directions, the eNB can transmit signals such as PSS/SSS/PBCH in each of the N beam directions. In other words, the eNB transmits synchronization signals such as PSS/SSS/PBCH in each direction by sweeping the directions that the eNB can have or support. Alternatively, if the eNB can form N beams, one beam group may be composed of several beams. PSS/SSS/PBCH can be transmitted in each beam group. In this case, one beam group includes one or more beams.

<Synchronization Procedure in New System>

Hereinafter, the structures of synchronization and broadcasting signals used in the new system will be described. When PSS/SSS/PBCH are transmitted based on beam scanning, a UE can acquire system timing as follows.

* Symbol/Subframe Timing and Cell ID Acquisition

To obtain information on symbol timing, a UE detects a PSS transmitted at a fixed location (for example, in 6 or x PRBs with respect to the center frequency) or a variable location. Similarly, the UE can obtain subframe timing and/or frame timing by detecting an SSS transmitted at a known location, that is, at a location relative to that of the PSS transmission resource. Then, by combining the PSS and the SSS, the UE can obtain a cell ID. To prevent signals transmitted through the SSS and relevant hypotheses from significantly increasing, the UE may obtain the subframe timing by detecting an additional synchronization signal (e.g., Extended Synchronization Signal (ESS)) transmitted from the eNB.

\* The number of Beam RS Ports

When PSS/SSS/PBCH and ESS are transmitted per beam direction, a Beam Reference Signal (BRS) can be transmitted for link quality measurement per beam direction. In other words, the BRS can be transmitted for the purpose of RSRP/RRM/RLM measurement, and it can be used for neighbor cell measurement. In addition, the BRS can be transmitted over the entire band to allow a UE to perform measurement over the entire band. For example, the BRS may be an RS transmitted over the entire band per antenna port for an analog beam direction in which the PSS/SSS are transmitted. In this case, the UE should know information on the number of ports used for BRS transmission and the location of resources per port on which the BRS is transmitted in advance. The number of ports used for the BRS transmission, that is, the number of BRS ports that the UE should measure at the corresponding time can be provided through the ESS. For example, assuming that the number of maximum BRS ports is 8, the eNB can inform the UE of {1, 2, 4, 8}, {2, 4, 6, 8}, or other combinations having different values through the ESS. Here, informing the number of antenna ports through the ESS may mean that the UE should attempt to detect the number of antenna ports from the ESS based on multiple hypotheses for the number of antenna ports. As another method for informing the number of BRS ports, the number of ports for a BRS that is transmitted in the same beam direction as a PBCH can be signaled on the PBCH. When the information on the BRS ports is transmitted on the PBCH, the UE should decode a PBCH of a neighbor cell and measure a BRS of the corresponding neighbor cell for neighbor cell measurement.

\* Extended Synchronization Signal/Sequence (ESS)

As described above, an ESS can be transmitted on frequency resources different from those used for transmitting PSS/SSS within the same symbol. When obtaining a cell ID and symbol timing, a UE may obtain subframe timing and frame timing from an ESS. Here, the acquisition of subframe timing may mean obtaining the start location of a subframe, that is, information indicating how many symbols exist prior to the symbol detected by the UE in the corresponding subframe. In addition, frame timing may be related to the transmission periodicity of a synchronization signal. After detecting a synchronization signal, the UE may estimate the time required until the same synchronization signal arrives and be able to know how many subframes exist prior to a specific subframe in the corresponding time interval. In addition, the number of BRS ports can be indicated through the ESS. Moreover, information on the number of DM-RS ports in a PBCH can be also indicated by the ESS. Simply, assuming that the PBCH is transmitted in the same transmit diversity scheme as that for SFBC, the number of PBCH DM-RS ports may be limited to 2. Alternatively, the number of PBCH DM-RS ports (for example, 1, 2, 4, or 8) may be indicated by the ESS. Further, the ESS may carry information on the system bandwidth or BRS transmission bandwidth. In this case, for RSRP measurement, the UE may check resources used for BRS transmission without decoding the PBCH.

\* Sequence Generation

>ESS: Considering that a UE should be able to obtain subframe timing from ESS detection, an ESS sequence needs to be designed such that the UE can obtain information about how many symbols exist prior to the symbol where an ESS is present in a corresponding subframe. Thus, an ESS sequence should be a function of the cell ID and the index of the OFDM symbol in which a corresponding ESS is transmitted.

Figure 10A:
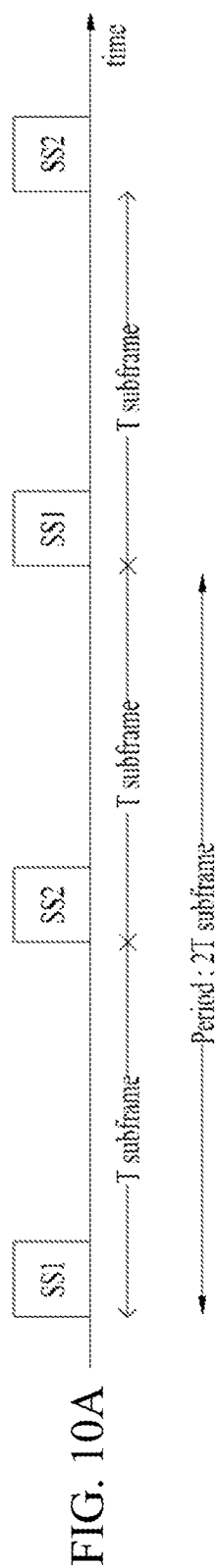
FIGS. 10A and 10B illustrate examples of a method for transmitting synchronization signals in the new system.
Figure 10B:
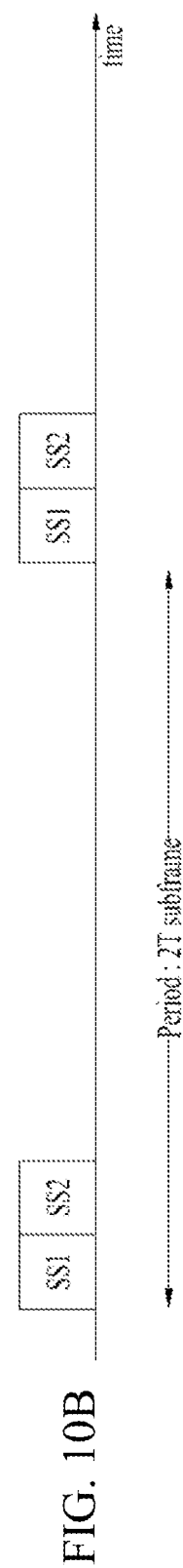

FIGS. 10A and 10B illustrate examples of a method for transmitting synchronization signals in the new system.

When an eNB does not have time resources sufficient to transmit synchronization signals for all beams in one subframe, the eNB may transmit the synchronization signals in a plurality of subframes. Here, the synchronization signal means a signal transmitted from the eNB for synchronization such as PSS/SSS/SSS. Assuming that the transmission periodicity of a Synchronization Signal (SS) is composed of P subframes and an eNB can generate B beams, the eNB can assume that B subframes are required to transmit all the SSs in respective directions of the B beams. FIGS. 10A and 10B show a case in which B is 2. For example, it is assumed two subframes are required to transmit all SSs in each beam direction. In addition, in a period corresponding to P subframes, an SS transmitted in the first subframe of the two SS subframes is denoted by SS1, and an SS transmitted in the second subframe is denoted by SS2. SS1 and SS2 may represent part of a set of SSs with multiple beam directions or some SSs transmitted in different subframes. SSs may be divided into SS1 in a specific subframe and SS2 in another subframe for transmission thereof. SS1 and SS2 may be transmitted at a certain time interval as shown in FIG. 10A, or they may be transmitted in consecutive subframes as shown in FIG. 10B. The time required for the eNB to transmit next SS1 and SS2 after transmitting current SS1 and SS2 can be defined as the synchronization signal transmission periodicity. In other words, the time required for the eNB to transmit synchronization signals in all of its beam directions after transmitting synchronization signals in the same beam directions can be defined as the synchronization signal transmission periodicity. For example, referring to FIGS. 10A and 10B, the synchronization signal transmission periodicity may be 2T subframes. When synchronization signals are distributed over a plurality of subframes and then transmitted in the plurality of subframes, information indicating which synchronization signal is transmitted in which subframe should be included. That is, when synchronization signals are distributedly transmitted, an ESS sequence may contain information on how many subframes there are before the subframe in which the corresponding ESS sequence is transmitted. To indicate how many subframes there are before the subframe in which the ESS sequence is transmitted among the subframes where the synchronization signals are transmitted or the subframes corresponding to the synchronization signal periodicity by using the ESS sequence, the ESS sequence may be generated as a function of the subframe index.

>BRS Sequence

Since a BRS is transmitted in a different beam direction according to symbols, a BRS sequence is generated as a function of the cell ID and symbol index and/or beam index. Alternatively, the BRS is generated as a function of the BRS antenna port number and BRS transmission subframe number.

>PBCH DM-RS Sequence

A PBCH DM-RS sequence is generated as a function of the cell ID, symbol index, PBCH transmission subframe number, and DM-RS port number.

>PBCH Information Contents

A PBCH may contain information such as basic system information, system frame number, the number of antenna ports, system bandwidth, etc. Additionally, the PBCH may contain information on PRACH configuration, time-frequency resources used for System Information Block (SIB) (i.e., SI) transmission (or the periodicity of SIB transmission), time-frequency resources used for paging transmission, etc. The PRACH configuration information may be included in the SIB (i.e., SI). The information on the time-frequency resources that can be used for the SIB and paging transmission may be independently signaled per beam direction (for example, per beam index). Upon obtaining information on time-frequency resources that can be used for SIB and paging reception, a UE performs blind decoding for PDCCH detection in order to receive the corresponding information in the subframes designated for the SIB and paging reception. When a UE-specific Search Space (USS) and a Common Search Space (CSS) are configured for a UE, the UE expects that a common channel is transmitted in subframes for the SIB/paging and then performs blind decoding of both the USS and CSS because the information on the SIB/paging transmission corresponds to system information. The UE does not perform blind decoding (BD) of the CSS on other subframes except the subframes for the SIB/paging. In this case, the CSS may mean a search space for all UEs in a cell. Alternatively, it may mean a Group-specific Search Space (GSS) commonly allocated for a plurality of UEs rather than all UEs in a cell. A group RNTI or group ID that a UE should read may be determined as a function of the beam ID having the same symbol or beam direction as that of the PSS/SSS that the UE successfully receives and the cell ID. Even if the configuration of the group ID is not separately provided to the UE, the UE may determine the group ID after detecting the beam ID and cell ID. Based on the group ID, the UE may receive an RNTI value used for receiving group common data and control information (for example, the corresponding RNTI value is signaled to the UE). Alternatively, the UE may use the group ID for scrambling or as a DM-RS scrambling ID.

\* On-Demand SI

Figure 11:
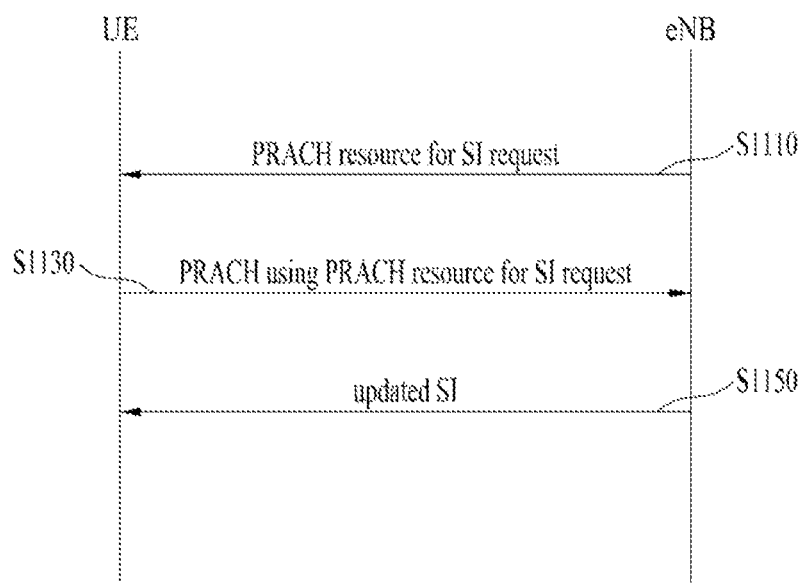
FIG. 11 illustrate an example where system information is transmitted/received according to the present invention.

FIG. 11 illustrate an example where system information is transmitted/received according to the present invention.

Meanwhile, in the conventional LTE/LTE-A system, all applicable system information (SI) is periodically broadcasted using physical resources of a corresponding cell. To broadcast the SI, different mechanisms are used. For example, an MIB is transmitted on a BCH with a periodicity of 40 ms, and SIB1 is transmitted on a DL-SCH with a periodicity of 80 ms, and other applicable SIBs are transmitted on a DL-SCH with time-frequency domain scheduling by an SI-RNTI on a PDCCH. Each of the applicable SIBs has a configurable periodicity and located within a time window. In some cases, SI corresponding to carrier aggregation and/or Dual Connectivity (DC) is provided through dedicated signaling, which is a part of the Radio Resource Control (RRC) reconfiguration procedure for a (P)Scell for a configured UE. Such an SI broadcasting approach is mainly suitable for macro cell deployment. However, this approach may not be optimal for other scenarios. That is, this broadcasting approach has a disadvantage in that resources are wasted, for example, when there are no or few UEs that camp on a cell, access to the system, and/or are interested in specific types of SIBs. Another disadvantage of the broadcasting approach is that when a UE obtains initial system information, latency occurs due to periodic broadcasting of the SI. For some SIBs, the UE should wait for a period until a relevant SIB(s) is transmitted, and average delay corresponding to half of a configured period is typically required before the UE determines whether to access the features of the corresponding system. A further disadvantage is that as the system is developed and additional functions are added, the expandability of the broadcasting approach is impacted. As the amount of SI increases, the broadcasting approach requires more resources. Specifically, as new information messages are added, each of the messages may need to be broadcasted through a new time window. Since this means that the UE should wake up more frequently, it may affect the power consumption of the UE. In particular, when the broadcasting approach is applied to the new RAT system, there may be additional disadvantages. When the new RAT system is deployed in a high-frequency band. The new RAT may require multiple beams to provide proper coverage when it is deployed in high frequency bands (e.g., more than 6 GHz). In this situation, if the broadcasting approach is used as in the conventional LTE/LTE-A system, that is, if SI is transmitted via each of the multiple beams, it may be inappropriate or inefficient. It is expected that the new RAT deployment includes not only macro deployment but high-density cells with small coverage. In the case of cells with wide coverage, the broadcasting approach for all the applicable system information is appropriate to provide functions of system access, camping, mobility, etc. On the other hand, in the case of cells with small coverage, it is desirable to provide the similar features and functions to those of a macro cell, but since a few UEs may exist in cell coverage at a given time, these cells may be more suitable for dedicated transmission. If the new RAT system supports a short TTI, a UE can obtain system information more rapidly using a dedicated signal compared to waiting for system information broadcasting. This may be required to support URLLC services properly. Further, in a high-density deployment, the broadcasting approach may increase interference levels and affects the network power consumption.

Therefore, the present invention proposes on-demand SI to reduce the amount of broadcasted SI. The on-demand SI may be provided when it is requested by a UE. In the new RAT system, some or all of the system information may be on-demand SI. In other words, in the frequency band to which the new RAT system is applied, all SI may be transmitted in an on-demand manner. Alternatively, some of the SI may be transmitted in an always-on manner, and the rest of the SI may be transmitted in an on-demand manner. The always-on SI may be common SI for all UEs transmitted in all beam directions of a corresponding cell. For example, SI essential for initial access may be periodically broadcasted as the always-on SI, and except the broadcast minimum SI, the remaining SI may be the on-demand SI. The on-demand SI may be UE-group specific SI transmitted in a specific beam direction.

An SI tag indicates whether there are changes in corresponding SI messages. To support on-demand SIBs or PBCH transmission, an SI tag may be transmitted through a PBCH or an ESS. For example, referring to FIG. 11, when an SI tag is changed, a UE may request SIB transmission through a RACH procedure (S1130). According to such an on-demand approach, even when the network updates SIBs (i.e., SI), the UE may not read the SIBs in a predetermined cycle if the UE does not need the update. Meanwhile, when the UE requests the SI transmission through the RACH procedure, the UE should perform the RACH procedure based on out-of-date SI to obtain the updated SI because the UE does not have the updated SI. When the UE performs the RACH procedure based on the out-of-date SIB, RACH resources available for the UE can be determined in advance (S1110). For example, the system may designate specific time/frequency or time/frequency/preambles for an SI request in advance. In particular, (in frequency band of 6 GHz or lower) RACH resources for an SI request may be shared by all UEs in a cell. When beamforming is applied in frequency band of 6 GHz or higher, RACH resources for an SI request may be designated per beam direction, that is, per SS block. When the UE performs PRACH transmission using corresponding RACH resources (S1130), an eNB may perform the SIB transmission before or after transmitting a Random Access Response (RAR) (S1150). In addition, when an SI tag is changed, the network can transmit only updated SIBs instead of transmitting all SIBs. If the eNB detects an SI request from SI-request RACH resources, the eNB may broadcast SI in a corresponding cell (in a corresponding beam direction) or transmit corresponding system information through the RAR for a corresponding preamble index. Alternatively, scheduling information on a time/frequency region in which corresponding system information is transmitted in response to an SI request may be included in the RAR for the SI request and then transmitted. When a UE transmits an RACH for the purpose of requesting on-demand SIBs or PBCH transmission, the UE may inform the eNB that the corresponding PRACH transmission is for requesting the SIBs through the message carried by the PRACH. In other words, the UE may explicitly inform, through the PRACH, that the purpose of the PRACH transmission is not to transmit specific data in UL but to receive specific data in DL, and more particularly, to request system information. To transmit such an explicit indication, the UE may set a field in the message carried by the PRACH to a specific value or transmit a specific sequence on the PRACH. In other words, separate PRACH resources or sequences for on-demand SIBs or PBCH transmission can be reserved (by the eNB for a specific UE or a specific beam direction) (S1110). Such an indication may be transmitted in Msg1 or Msg3. For example, when UL timing is not synchronized, a UE may attempt PRACH transmission and transmit an SI request in Msg3.

\* Beam Index Acquisition and RACH Resource Selection Criteria

Figure 12:
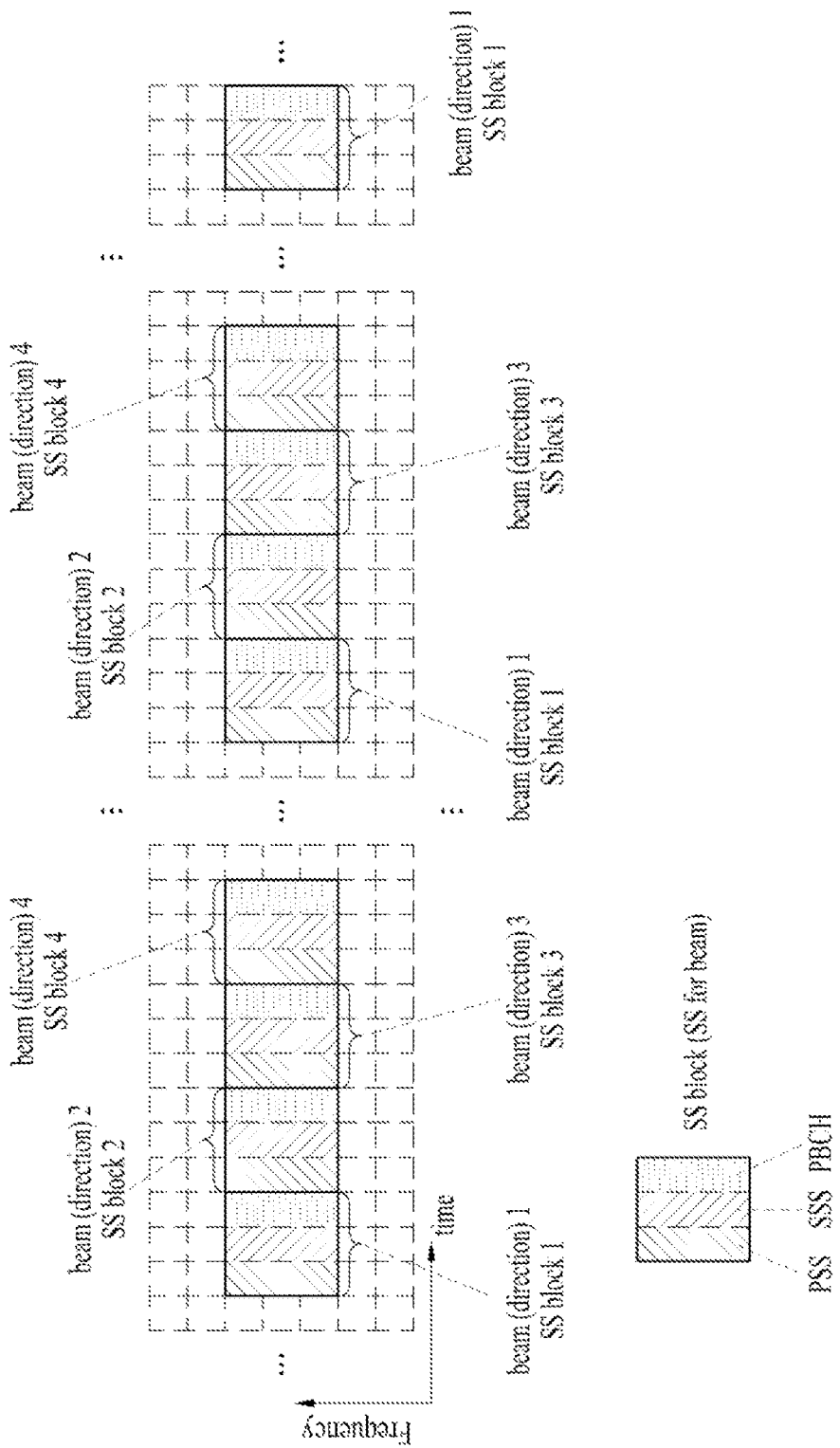
FIG. 12 illustrates an example where an SS is transmitted per beam direction on a cell or carrier.

FIG. 12 illustrates an example where an SS is transmitted per beam direction on a cell or carrier. Although FIG. 12 shows that SS blocks, and more particular, a plurality of SS blocks for multiple beams are consecutively transmitted, SS blocks for a set of beams may not be consecutively transmitted on a corresponding cell/carrier as shown in FIG. 10A).

Assuming that an eNB can have N beam directions and transmit PSS/SSS in each of the N beam directions, a UE may observe that the signal strength varies in each direction when detecting the PSS/SSS. The UE performs PSS/SSS detection with respect to PSS/SSS, which are transmitted per symbol in different directions, on a subframe in which the PSS/SSS are transmitted (hereinafter referred to as a PSS/SSS subframe). In addition to the PSS/SSS, an ESS, a PBCH, and an RS for PBCH decoding (hereinafter referred to as a PBCH DM-RS) are transmitted through beamforming. Therefore, from the above-described signals, the UE can obtain the beam direction most suitable for the corresponding UE, that is, the beam direction where signals are received with the best channel quality. Then, by reporting the optimal beam direction or the resources where the PSS/SSS/PBCH with the best channel quality are present to the eNB, the UE can receive the PDCCH/PDSCH transmitted via the optimal beam. Similarly, for the PUSCH/PUCCH transmitted from the UE, the eNB may perform proper reception (RX) beamforming.

To identify a beam direction, an index or ID may be assigned to each beam (that is, each beam direction) or per beam group. A beam index may be tied with a symbol index where PSS/SSS/PBCH and BRS are transmitted so that the beam index may be implicitly promised/defined between the eNB and UE. Alternatively, a beam index may be tied with a symbol index where PSS/SSS/PBCH and BRS are transmitted and a BRS port number having the best reception quality in the corresponding symbol so that the beam index may be promised/defined between the eNB and UE.

The signals transmitted in the same direction including PSS/SSS/PBCH can be defined as one SS block. When there are multiple SS blocks, the SS blocks may be separately indexed to distinguish therebetween. A specific SS block may indicate the transmission direction of a DL signal/channel such as PSS/SSS/PBCH. For example, in a certain system, if PSS/SSS/PBCH are transmitted in 10 beam directions, the PSS/SSS/PBCH transmitted in the same direction may be configured as one SS block. In addition, the corresponding system could be interpreted to have 10 SS blocks. Since SS blocks are related to beam directions one-by-one, an SS block index could be interpreted to be a beam index.

After detection of a cell ID, subframe timing, and symbol timing, the index of a specific beam may be implicitly identified by the symbol index where the PSS/SSS corresponding to the cell ID are transmitted and the BRS port index with the best reception quality in the corresponding symbol. However, when PSS/SSS transmission periodicity is P (e.g., P subframes) and an eNB needs B subframes to transmit all its beams, it is impossible to identify a beam index by simply using a cell ID and a symbol index. Thus, in this case, to identify the beam index, information on a subframe where corresponding PSS/SSS are detected (e.g., information on how many subframes there are before the subframe where the PSS/SSS are present) should be combined with the cell ID and symbol index. On the contrary, the eNB and UE can explicitly exchange a beam index with each other via an SSS, ESS, BRS (beam RS), or PBCH. Here, the BRS means an RS transmitted over the entire band to estimate a beam direction transmitted per symbol.

According to the present invention, a beam index may mean an index with an explicit number or order for beam directions. Alternatively, in the present invention, a beam index may mean a specific beam direction of a symbol where PSS/SSS are transmitted rather than an index with an explicit number or order for beam directions. In addition, in the present invention, a beam index may mean the direction of a beam transmitted via a BRS port with the best reception quality among the directions of specific beams transmitted from an eNB in a symbol where PSS/SSS are transmitted. Moreover, in the present invention, a beam index may mean the index of a beam group including multiple beam directions and indicate a grouped beam direction having multiple beam directions. Further, in the present invention, a beam index may mean an SS block index as described above. In determining the beam index with the highest reception quality, a UE may inform the eNB that which beam direction is most suitable for the corresponding UE without explicitly reporting the beam index as described above. That is, if a RACH resource is configured for and connected to each direction in which broadcast signals such as PSS/SSS/PBCH are transmitted, the UE can inform the best beam direction without signaling the beam index separately. In other words, if a UE transmits a PRACH preamble using a specific RACH resource, the eNB may know that the beam direction optimized for the UE is the beam direction in which the PSS/SSS/PBCH connected to the specific PACH resource are transmitted. The eNB can estimate the beam index with the best reception quality from the perspective of the corresponding UE, that is, the SS block index from the RACH resource used by the UE to transmit the PRACH preamble.

In order for a UE to determine a beam index or SS block index suitable for the UE or an SS block index, the following alternatives can be considered. The UE may select a set of preferred beams using one or any combination of the following alternatives and list up a plurality of RACH resource candidates associated with the corresponding beams.

>Alt1: After successfully detecting PSS/SSS or ESS, a UE selects a beam index or SS block index where the received SINR of the PSS/SSS is equal to or more than a specific threshold.

>Alt2: As a method for using a PBCH DM-RS used for PBCH demodulation, a UE selects a beam direction (e.g., beam index) or SS block index where the Reference Signal Received Power (RSRP) of the PBCH DM-RS is equal to or more than a specific threshold before the PBCH demodulation.

>Alt3: A UE selects a beam index or SS block index where the RSRP of the BRS, which is transmitted in partial or the entire band, is equal to or more than a specific threshold from among beams where the UE successfully performs PSS/SSS detection and PBCH decoding.

>Alt4: In addition to Alt1, Alt2, or Alt3, if it is assumed that load or priority information is transmitted via an ESS or PBCH, a UE may select a beam or SS block index with low loads or high priority from among beams where received signals are greater than a threshold by using such information. Alternatively, the UE may select the beam or SS block index by combing the received signal quality and load/priority information. For example, Alt4 may be used to prevent downlink/uplink and RACH resources from being concentrated on a specific beam direction and distribute downlink/uplink loads over multiple beam directions.

>Alt5: A UE transmits information on multiple selected or detected beams (e.g., SS blocks) (for example, beam indices or SS block indices) through first uplink transmission corresponding PRACH Msg3 so that the network can select a beam for the UE.

In each of Alt1, Alt2, Alt3, Alt4 and Alt5, when a UE selects the optimal beam index or SS block index and reports corresponding information to the eNB, the UE may also transmit the hypothesis/basis used for selecting the corresponding beam index or SS block index. For example, a UE may report the received signal quality together with the beam index or SS block. In Alt1, information on the received SINR of the PSS/SSS may be transmitted together with the corresponding beam index. In Alt 2, information on the RSRP of the PBCH DM-RS may be transmitted together with the corresponding beam index. In Alt3 or Alt4, if the beam or SS block is selected on the basis of a BRS, information on the RSRP of the BRS may be transmitted together with the corresponding beam index. When the UE transmits a RACH preamble by selecting RACH resources associated with the optimal beam direction instead of reporting the beam index, the UE may report the quality of a DL signal received in the corresponding beam direction while performing UL transmission after RACH message 3 (Msg3).

In addition, the UE may select a plurality of optimal beam indices or SS block indices where the received signal quality is higher than a predetermined threshold and report to the network the selected DL beam directions and information on the DL received signal quality per beam direction. Specifically, the UE may report the information when transmitting RACH Msg3 or transmitting UL data thereafter.

The above description of the SS block transmission in multiple beam directions and mapping between SS blocks and RACH resources are made on the premise that reciprocity capable of determining transmission/reception beam directions between a UE and a Transmission and Reception Point (TRP) is established. However, in a multi-beam environment, PRACH preamble repetition or beam sweeping may be considered according to TX/RX reciprocal capability of a TRP (e.g., eNB) or UE. The TX/RX reciprocal capability could be interpreted as TX/RX beam correspondence at the TRP and UE. If the TRP and UE cannot maintain the TX/RX reciprocal capability in the multi-beam environment, the UE may be unable to transmit an uplink signal in the beam direction where the UE receives a downlink signal. This is because the UL optimal path may be different from the DL optimal path. If the TRP can determine a TRP RX beam for corresponding uplink reception based on UE's downlink measurements for one or more TX beams of the TRP and/or if the TRP can determine a TRP TX beam for corresponding downlink transmission based on TRP's uplink measurements for one or more RX beams of the TRP, the TX/RX beam correspondence at the TRP can be hold. Meanwhile, if the UE can determine a UE RX beam for corresponding uplink transmission based on UE's downlink measurements for one or more RX beams of the UE and/or if the UE can determine a UE TX beam for corresponding downlink reception based on an indication from the TRP, which is made based on uplink measurements for one or more TX beams of the UE, the TX/RX beam correspondence at the UE can be hold.

* PRACH Resource Configuration

According to the present invention, since PSS/SSS are transmitted through beamforming, RX beamforming should be applied to PRACH resources, which are used by a UE to attempt uplink random access, according to the direction in which an eNB transmits PSS/SSS for successful PRACH reception. To this end, the PRACH resources may be allocated per PSS/SSS direction, that is, per beam index (or SS block index). As described above, a RACH resource may be associated with each SS block index where PSS/SSS and PBCH are transmitted. Basically, a RACH resource may mean a time-frequency resource where an RACH preamble may be transmitted.

When a UE successfully detects PSS/SSS and selects best N beams, the UE needs to obtain information on PRACH resources per beam index or SS block index. Basically, PRACH resources means time-frequency resources used by a UE to transmit a PRACH, and information on PRACH sequences, root sequences, PRACH transmission power, maximum retransmission number, repetition number, etc. may be further included. For example, the UE may inform the network of its preference for a specific SS block index using the time-frequency resources used by the UE for PRACH preamble transmission and a PRACH preamble index used by the UE. The PRACH time-frequency resources may include information on a subframe number that can be used to transmit a PRACH in the direction corresponding to a beam index (or value for indicating a corresponding subframe), symbol numbers in the corresponding subframe, the number of symbols in the corresponding subframe, a PRB index in the frequency domain (a value for indicating the location of a corresponding PRB in the frequency domain), and/or frequency-domain bandwidth, etc. PRACH resources for different beam indices or SS block indices may be TDMed. Assuming that an eNB performs RX beam scanning to receive an RACH for a single beam, a corresponding beam direction is reserved during a corresponding symbol or beam scanning duration regardless of whether there is RACH transmission. In other words, since the UE can autonomously transmit an RACH preamble on RACH resources, it is assumed that the corresponding RACH resources are reserved at all times. To reduce this period, a number of UEs need to be multiplexed during a certain period by using the system bandwidth as much as possible. Thus, multiple PRACH resources can be configured in the frequency domain. UEs can be distinguished by using Code Division Multiplexing (CDM), by using Frequency Division Multiplexing (FDM) instead of the CDM or by using both of the CDM and FDM. That is, even when UEs use the same time-frequency RACH resources, information indicating that a UE prefers a specific SS block index or information indicating that the signal quality of the corresponding SS block index is good can be signaled if the UEs use different codes (e.g., preamble sequences).

As another method, PRACH resources can be commonly configured for all beam indices. That is, time-frequency resources on which a UE can transmit a PRACH and an eNB can expect PRACH transmission from a UE may be commonly configured for all beam directions, or one time-frequency resource may be allocated per beam index group. When PRACH resources are commonly configured for multiple beams, latency can be reduced. When PRACH resources are commonly configured for multiple or all beams, PRACHs corresponding to a plurality of beam indices can be transmitted on one time-frequency resource. In other words, PRACH transmission time-frequency resources for UEs having different optimal beam directions may be shared between multiple UEs or between multiple beam indices. Alternatively, PRACH time-frequency resources may be configured in a cell-common manner. In the case of common PRACH resources, it is assumed that a UE transmits a PRACH without using a specific beam, and the performance degradation caused when the eNB does not use RX beamforming may be overcome by PRACH repeated transmission and the like. Alternatively, whether common PRACH resources or PRACH resource where RX beams are assumed are selected can be determined by latency requirements, power constraint, RSRP, etc. In addition, how a UE transmits a PRACH may be slightly changed according to RACH resource selection. For example, in the case of transmission where no RX beam is assumed, the network may not know the beam optimized for the UE. In this case, there is a disadvantage in that a subsequent transmission channel such as an RAR may be transmitted without use of any TX beam. When such common RACH resources are used, RACH resources may be fixedly reserved based on beam directions, and thus the disadvantage that the corresponding radio resources cannot be used by a UE with a different beam direction can be overcome. The network can dynamically adjust the amount of common RACH resources and the amount of RACH resources that depend on beam directions. In general, although the amount of transmission resources through TX/RX beams and coverage thereof may be low, resources for wide beams or omni-direction transmission may be divided. Depending on whether omni-direction resources or RX beam resources are used, the eNB may differently configure the power of the UE or dynamically inform the UE of the resource type (e.g., PUSCH resource) so that the UE can operate by changing the number of repetitions. In other words, the eNB informs information on receiver gain semi-statically or dynamically so that the UE can determine its power and repetition. Alternatively, for better matching of the transmission/reception beam directions between the UE and eNB, mutually promised RACH transmission resources may be distinguished from RACH transmission resources used by the eNB to receive a PRACH preamble by rotating the reception beam direction. As a further example, for better matching of the transmission/reception beam directions between the UE and eNB, the mutually promised RACH transmission resources may be distinguished from RACH transmission resources on which the eNB fixes the reception direction but the UE performs PRACH preamble transmission by rotating the transmission direction.

To compensate for the disadvantages of RAR transmission when the above PRACH resources are used, the eNB may configure the beam direction where an RAR is transmitted together with RACH resources. When a UE does not support the configured RAR beam direction, the UE may not select the corresponding RACH resources. That is, although PRACH resources may be shared by all UEs, the PRACH resource may be sub-divided according to TX beam directions of the RAR transmission, and each UE may select its PRACH resources from among the sub-divided PRACH resources according to the RAR transmission beam directions. That is, the network instructs the eNB to use TX beams as described above but may also allow the eNB to perform the RACH reception without the RX beam scanning. Alternatively, RACH resources may be configured such that the eNB can perform reception beam scanning instead of being fixed in the reception beam direction.

The above-described method by which RACH resources are shared by a plurality of SS block indices can be applied more effectively when the beam correspondence of an eNB or TRP is not matched. When the TRP's beam correspondence is not matched, a UE may repeatedly transmit a PRACH preamble, and the TRP may perform the reception beam scanning operation to receive the PRACH preamble. In this case, the preamble indices used by the corresponding UE may be part of an index set associated with a specific SS block index. That is, although the UE transmits a PRACH preamble on time-frequency RACH resources shared by a plurality of SS block indices, the UE may inform the network of its preferred specific SS block index because the PRACH preamble is related to the specific SS block index. PRACH resource configuration information includes a time-frequency resource region that can be used by a UE for PRACH transmission, a PRACH transmission preamble index, preamble transmission power, RA-RNTI information used for PRACH transmission. In addition, the PRACH resources may be separately configured per beam index or SS block index, and the information included in the PRACH configuration may be independently configured per beam index or SS block. In other words, the preamble index, preamble transmission power, and RA-RNIT may vary per beam index or SS block index. All or some of the information included in the PRACH configuration may be beam-index-specific. For example, the time-frequency resources available for PRACH transmission may be shared by a plurality of beam indices or all beam indices, and in this case, the PRACH time-frequency resources in the PRACH configuration may be common for beam indices included in a specific beam index group or all beam indices. However, each piece of information should be transmitted per beam index. In addition to the PRACH configuration, an RAR window size and time-frequency resource for RAR transmission may be configured/signaled per beam index (e.g., SS block index). Alternatively, the RAR window and/or time-frequency resources for the RAR transmission may be common for multiple beam indices.

When PRACH transmission has succeeded, the eNB transmits an RAR for the successful PRACH transmission.

In this case, RACH configuration information may include configuration information on the RAR, and it can be provided to a UE(s). The RAR configuration information representatively contains information on a time-frequency region where the RAR is transmitted. Details will be described later. Information on the PRACH resource configuration corresponding to a beam index can be transmitted on a channel different from that transmitted in a symbol where the PSS/SSS with the same beam index as that of the corresponding PRACH resources are present. The following options can be applied to channels capable of carrying the PRACH configuration.

>Option 1. A PBCH carries the PRACH configuration: The PRACH configuration may be transmitted on a PBCH that is transmitted in the same symbol and direction as those of the PSS/SSS (that is, with the same beam index as that of the PSS/SSS). That is, if the PBCH is used to carry the PRACH configuration, it may increase the amount of information transmitted on the PBCH. Considering that the PBCH should carry essential information that even a cell-edge UE needs to successfully decode, this may not be an appropriate option. However, the amount of resources for the PBCH transmission is sufficient, the PRACH information can be transmitted on the PBCH.

>Option 2. An SIB carries the PRACH configuration: An SIB containing the PRACH configuration as the main information may be transmitted in the same symbol and direction as those of the PSS/SSS (that is, with the same beam index as that of the PSS/SSS). Alternatively, the location of resources for SIB transmission may be indicated by a PBCH. By receiving the SIB at the corresponding location, a UE may obtain the PRACH configuration information of a corresponding beam index.

* PRACH Transmission and Reporting of Best N Beam Indices

A UE may select a plurality of beam indices/directions for the beam direction that is preferred by the UE or has the best reception quality and obtain PRACH configuration information per beam index or beam direction. That is, an eNB may transmit the PRACH configuration information per beam index. In a multi-beam environment, a plurality of SS blocks may be defined. Each of the plurality of SS blocks may be transmitted in its unique DL transmission beam direction. In addition, RACH resources may be configured per SS direction. The UE may receive signals/channels in SS blocks and select an SS block index with the best reception quality. Moreover, the UE may transmit a PRACH preamble by selecting the RACH resources associated with the corresponding SS block index. In this case, the UE may select one or more SS block indices and attempt the PRACH preamble transmission on RACH resources associated with each of the SS blocks. Hereinafter, options by which a UE transmits a PRACH preamble will be described.

>Option 1. Sequential PRACH transmission: A UE attempts PRACH transmission preferentially for the most preferred beam index (e.g., SS block index) among preferred best N beam indices (e.g., SS block indices). That is, the UE transmits a PRACH on a PRACH resource corresponding to the best beam index. Upon receiving PRACH Msg1 on a specific PRACH resource, an eNB can understand that the corresponding UE prefers the beam corresponding to the PRACH resource. In addition, by transmitting an RAR for the corresponding PRACH, the eNB may confirm (or approve) the UE to use the corresponding beam index (i.e., corresponding beam direction). The RAR is transmitted on a predefined RAR resource. When the UE fails to receive the RAR for the PRACH transmitted on the PRACH resource corresponding to the beam index (e.g., SS block index), the UE transmits a PRACH on a PRACH resource corresponding to the beam index (e.g., SS block index) with the next best quality and waits for a RAR. The UE can report its preferred beam index by simply transmitting a PRACH corresponding to a specific beam index (e.g., SS block index). In addition, the eNB can confirm (or approve) use of the corresponding beam index by transmitting an RAR in response to the corresponding PRACH or reject use of the corresponding beam index by transmitting no RAR. When the UE does not receive any RAR for the transmitted PRACH, the UE attempts the PRACH transmission using a PRACH resource corresponding to another beam index (e.g., SS block index) and waits for an RAR.

>Option 2. Multiple PRACH transmission: If a UE obtains PRACH configuration information corresponding to all best N beam indices (e.g., SS block indices), the UE may transmit a PRACH for each of a plurality of preferred PRACH configurations. In addition, an eNB may transmit a RAR for each beam index. In other words, the UE may separately perform a RACH procure per beam index (e.g., SS block index). However, according to option 2, since one UE occupies a plurality of PRACH resources for PRACH transmission, it has a disadvantage in that collision probability between UEs on PRACH resources increases. Meanwhile, the UE may transmit a plurality of PRACHs for different beam indices without receiving an RAR for the previously transmitted PRACH. The eNB may respond to a plurality of PRACHs transmitted from a specific UE using one RAR in a given RAR window. In this case, the eNB may confirm use of a specific beam index (e.g., SS block index) by transmitting an RAR for the corresponding beam index. Specifically, the eNB may confirm use of the specific beam index by transmitting the RAR on an RAR resource corresponding to the specific beam index or transmitting the RAR using an RA-RNTI or sequence corresponding to the specific beam index.

>Option 3. Preferred preamble sequence transmission: A UE may select preferred best N beam indices (e.g., SS block indices). Thereafter, when transmitting a PRACH for a specific beam, the UE may report the most preferred beam index (e.g., SS block index) to an eNB. The UE may performs PRACH transmission by selecting the earliest PRACH resource in the time domain or the most preferred PRACH resource, and in this case, the UE may selects a preamble index from the PRACH configuration corresponding to the most preferred beam index. That is, a PRACH preamble transmitted by the UE may be unrelated to the beam index of the PRACH resource used for transmitting the corresponding PRACH. In other words, if the UE knows in which direction the eNB performs RX beamforming for the purpose of PRACH reception, the UE may transmit a PRACH on a specific PRACH resource in the corresponding direction, but the UE may use a preamble index that is not related to the beam index (e.g., SS block index) associated with the corresponding resource but related to another beam index (e.g., SS block index) for the PRACH transmission. By doing so, the eNB may know that the UE prefers the beam direction corresponding to the beam index (e.g., SS block index) related to the corresponding beam index. Moreover, the eNB may also know that the beam index (i.e., beam direction) corresponding to the resources used for PRACH preamble transmission can be used for transmission/reception to/from the corresponding UE.

>Option 4. PRACH transmission with preferred RA-RNTI: Similar to option 3, a UE may transmit a PRACH on a PRACH resource corresponding to a random beam index (e.g., SS block index) among best N beam directions suitable for the corresponding UE but use RA-RNTI corresponding to another beam index. Similar to option 3, the UE may have a different preference for PRACH resources and signal to an eNB that the channel environment is good by selecting RA-RNTI of another beam index (e.g., SS block index). The RA-RNTI is a function of the PRACH transmission time resource index (e.g., subframe number or symbol index), the frequency resource index (e.g., PRB index or absolute frequency), and the beam index.

>Option 5. PRACH transmission on common PRACH resource: The above options are described on the assumption that a PRACH resource is allocated/signaled per beam index (e.g., SS block index). However, the options can also be applied when a PRACH transmission time-frequency resource are commonly allocated to all beam indices (e.g., SS block index) or when the resource is shared by a plurality of beam index groups. For example, an eNB may transmit a PRACH configuration per beam (i.e., per SS block index) or per beam group. In this case, part of information on the PRACH configuration per beam index (e.g., SS block index) or per beam group may be beam index (e.g., SS block index) common information, and other information may be beam index (e.g., SS block index) specific information. In particular, PRACH time-frequency resources may be the beam index (e.g., SS block index) common information. The UE transmits a PRACH on the signaled PRACH time-frequency resource but the UE may use a preamble sequence/index corresponding to a specific beam index (e.g., SS block index) to transmit information on its preferred beam index (e.g., SS block index) to the eNB. In other words, a plurality of UEs may transmit PRACHs on the PRACH time-frequency resource, but in this case, each UE may have a different preferred reception beam direction (i.e., transmission beam direction of the eNB). Each UE may signal its preferred beam direction when transmitting a PRACH. For example, each UE may informs the eNB of its preferred beam direction using a preamble index or RA-RNTI in a PRACH configuration corresponding to a specific beam index (e.g., SS block index).

>Option 6. Earliest timing first: A UE may use the earliest PRACH resource among PRACH resources for candidate beams or available PRACH resources. If timing such as an RAR, Msg3, Msg4, etc. is used together with a PRACH configuration, the UE may select a resource capable of reducing the total process time maximally.

In addition to options 1 to 6, a method by which a UE selects a PRACH resource corresponding to the beam or SS block with the largest amount of resources or a method by which a UE selects a PRACH resource by considering the amount of loads as described above can be considered as well. In other words, load information can be signaled as RACH configuration information per SS block. This load information may be used to restrict RACH transmission for a specific SS block index, and more specifically, restrict to make a random access attempt using a specific RACH resource. As a similar method, a transmission power offset may be signaled as RACH configuration information per SS block index. For example, when a UE measures a received signal level per beam (i.e., per SS block), the UE may calculate an actual received signal level by adding or subtracting the signaled power offset. The power offset may enforce a UE to select a specific SS block index and attempt a RACH procedure by using an RACH resource associated with the selected SS block or prohibit the UE from selecting the specific SS block index.

\* RAR Configuration and RAR Transmission

In the LTE system, an RAR message includes an RACH preamble sequence index detected by an eNB, a Timing Advance (TA) command for adjusting UE's uplink transmission timing, uplink transmission power information, power ramping information, UL grant for Msg3 transmission, a temporary ID, etc. In the conventional LTE/LTE-A system, RAR transmission generally indicates that UE's RACH transmission is successful. Thus, upon receiving an RAR for a RACH preamble which has been transmitted on a specific cell/carrier, a UE performs uplink transmission based on the corresponding RAR unless a radio link on the corresponding cell/carrier is disconnected or a RACH procedure is retriggered by a PDCCH order and the like, instead of retransmitting the RACH preamble.

According to the present invention, an RAR may include network load information in a specific beam direction. That is, by signaling whether there are large or small loads, an eNB may allow a UE who transmits a corresponding preamble to make RACH attempt to another beam. If receiving an RAR indicating that there are large loads in the direction where the PRACH is transmitted, the UE performs a RACH procedure for another beam direction on the corresponding cell/carrier even though the UE receives the RAR for the PRACH transmission corresponding to the corresponding beam direction. The load information in an RAR may be used as a beam switching command. The network may designate a separate preamble for beam switching in an RAR message. When instructing beam switching through an RAR, the eNB may inform preamble transmission power for another beam direction. If the RAR containing the beam switching instruction has no signaling related to transmission power, the UE may consider the PRACH transmission for another beam direction as PRACH retransmission and then perform the retransmission by ramping up the power. In this case, the UE may select a beam direction with the best quality among beam directions except the beam direction in which the load information is signaled and then transmit a PRACH preamble for the selected beam direction.

When an RAR for a PRACH configuration corresponding to a specific beam index is transmitted/received, the RAR configuration for each PRACH configuration may be established independently or commonly. After transmitting a PRACH, a UE may expect that an RAR will be transmitted within a specific window after k subframes or a specific time from the PRACH transmission time. In other words, the UE may expect that the RAR for a PRACH will be transmitted within a predetermined time period (i.e., time window) from the k-th subframe (or specific time) after the UE transmits the PRACH. For example, if a UE transmits a PRACH in subframe n, the UE may expect that an RAR for the PRACH will be received within a specific time period (i.e., RAR arrival window) from subframe k. Here, the value of k and the RAR arrival window may be signaled/defined per PRACH configuration. In other words, these two values may be signaled/defined per beam index. Alternatively, the value of k and the RAR arrival window may be signaled or defined commonly for all PRACH configurations. Although each beam direction has a different PRACH resource, multiple RACHs belonging to the same beam-group may share the same RAR window. In this case, although PRACH preambles for a plurality of beam directions are transmitted on different time resources in an uplink time period corresponding to the downlink time period required for the eNB to transmit SSs/PBCHs in all beam directions, the UE may expect that an RAR(s) for the PRACH preambles will be received on the same time resource.

FIGS. 13A and 13B illustrate Random Access Response (RAR) message formats according to the present invention.

Let's assume that a UE transmits preamble 1 on an RACH resource for beam index A and (the same/a different) UE transmits preamble 2 on an RACH resource for beam index B. In this example, an RAR for preamble 1 and an RAR for preamble 2 can be transmitted in the same window.

Particularly, responses for multiple PRACHs may be transmitted as a single RAR message. In other words, responses for PRACH transmission for various beam indices or SS blocks may be included in one RAR message. In this case, which PRACH response in an RAR message corresponds to which beam index may also be signaled. In particular, if one RACH resource is shared by a plurality of beam indices or SS block indices because an eNB has low beam correspondence, responses for RACH preamble transmissions associated with the plurality of beam indices may be transmitted in one RAR message. In this case, referring to FIG. 13A, beam indices for individual PRACH responses are signaled in one RAR message.

Alternatively, an RAR may be transmitted per beam index. In this case, each RAR message carries a corresponding beam index. PRACH responses for a corresponding beam index may be transmitted in an RAR message. For example, referring to FIG. 13B, RAR 1 and RAR 2 for preamble 1 and preamble 2, which are transmitted for beam direction A, are transmitted together with beam index A in one RAR message, and RAR 1 and RAR 2 for preamble 1 and preamble 2, which are transmitted for beam direction B, are transmitted together with beam index B in another RAR message.

When N PRACH transmission time units corresponding to K beam indices are deployed consecutively or uniformly, M RAR message reception time units corresponding to N PRACH signals may be deployed consecutively or uniformly. In this case, M may be equal to or less than N, and N may be equal to or less than K. According to this method, since RARs are sequentially arranged in PRACH transmission order, which RAR is for which beam may be automatically recognized. Assuming that a set of M RAR time units is an RAR window, a UE may perform RAR detection/reception operation as follows. The UE first performs PRACH signal transmission through a PRACH time unit corresponding to its preferred beam index and sequentially checks beam indices included in a received RAR, for example, starting at the first RAR time unit in the RAR window.

If a beam index included in the received RAR is equivalent to its preferred beam index or the beam index corresponding to the PRACH time unit transmitted by the UE and/or if a PRACH preamble ID included in the RAR is equivalent to that of the PRACH signal transmitted by the UE, the UE may perform subsequent operation (e.g., Msg3 transmission) according to the corresponding RAR and stop the RAR detection/reception operation in the corresponding RAR window.

If the beam index (and/or PRACH preamble ID) included in the RAR(s) received through all the M RAR time units in the RAR window is not equivalent to the PRACH signal transmitted by the UE, the UE may consider that the RAR reception fails and then perform subsequent operation (e.g., PRACH signal retransmission, PRACH power ramping, and/or PRACH transmission count increment).

According to the present invention, the eNB can efficiently use resources by configuring/transmitting only the RAR for the actually received PRACH in the RAR window. For example, the eNB may transmit RARs in first some symbols/periods within the RAR window and transmit DL/UL data/control channels in the remaining symbols.

* PRACH Retransmission, RACH Resource Selection, and/or Power Control (Method 1)

The random access procedure of the 3GPP LTE system can be summarized as follows.

From the physical layer perspective, the L1 random access procedure encompasses the transmission of random access preamble and random access response. The remaining messages are scheduled for transmission by the higher layer on the shared data channel and are not considered part of the L1 random access procedure. A random access channel occupies 6 resource blocks in a subframe or set of consecutive subframes reserved for random access preamble transmissions. The eNB is not prohibited from scheduling data in the resource blocks reserved for random access channel preamble transmission. The following steps are required for the L1 random access procedure.

Layer 1 procedure is triggered upon request of a preamble transmission by higher layers.

A preamble index, a target preamble received power (PREAMBLE_RECEIVED_TARGET_POWER), a corresponding RA-RNTI and a PRACH resource are indicated by higher layers as part of the request.

A preamble transmission power PPRACH is determined as $P_{PRACH}=\min\{P_{CMAX,c}(i),$ PREAMBLE_RECEIVED_TARGET_POWER$+PL_c\}$_[dBm], where $P_{CMAX,c}(i)$ is the configured UE transmit power defined in 3GPP TS 36.101 for subframe i of serving cell c and $PL_c$ is the downlink path loss estimate calculated in the UE for serving cell c.

A preamble sequence is selected from the preamble sequence set using the preamble index.

A single preamble is transmitted using the selected preamble sequence with transmission power PPRACH on the indicated PRACH resource.

Detection of a PDCCH with the indicated RA-RNTI is attempted during a window controlled by higher layers (see 3GPP TS 36.321, section 5.1.4). The higher layers parse the transport block and indicate the 20-bit uplink grant to the physical layer.

Meanwhile, the random access procedure at the medium access control (MAC) layer can be performed as follows.

set PREAMBLE_RECEIVED_TARGET_POWER to 'preambleInitialReceivedTargetPower+DELTA_PREAMBLE+(PREAMBLE_TRANSMISSION_COUNTER−1)*powerRampingStep';

If the UE is a bandwidth limited (BL) UE or a UE in enhanced coverage:

instruct the physical layer to transmit a preamble with the number of repetitions required for preamble transmission corresponding to the selected preamble group (i.e., numRepentionPerPreambleAttempt) using the selected PRACH corresponding to the selected coverage enhancement (CE) level, corresponding RA-RNTI, preamble index, and PREAMBLE_RECEIVED_TARGET_POWER.

else:

instruct the physical layer to transmit a preamble using the selected PRACH, corresponding RA-RNTI, preamble index and PREAMBLE_RECEIVED_TARGET_POWER.

In the LTE/LTE-A system, information on UL transmission power for PRACH preamble transmission is included in an RACH configuration and transmitted to a UE. For example, UE-common random access parameters such as preambleInitialReceivedTargetPower, powerRampingStep, preambleTransMax, etc. are transmitted to the UE through an RRC signal (see PRACH-Config of TS 36.331). PREAMBLE_TRANSMISSION_COUNTER starts from 1 and increases by 1 whenever preamble transmission is attempted. The maximum number of times that preamble transmission can be performed is defined as preambleTransMax, and the preamble transmission can be repeatedly performed no more than preambleTransMax. For example, if PREAMBLE_TRANSMISSION_COUNTER=preambleTransMax+1, the MAC layer informs higher layers of a random access problem and considers that the random access procedure is unsuccessfully completed. DELTA_PREAMBLE has the following predefined values (see Table 7.6-1 of 3GPP TS 36.321).

TABLE 2

| Preamble Format | DELTA_PREAMBLE value |
|---|---|
| 0 | 0 dB |
| 1 | 0 dB |
| 2 | −3 dB |
| 3 | −3 dB |
| 4 | 8 dB |

In Table 2, the preamble formats are given by prach-ConfigIndex (see PRACH-ConfigIndex of TS 36.331).

As described above, in the LTE/LTE-A system, the PRACH preamble transmission power is determined according to equation (1) below.

$$P_{PRACH} = \min\{P_{CMAX,c}(i), \text{PREAMBLE\_RECEIVED\_TARGET\_POWER} + PL_c\}\_[dBm]. \quad \text{Equation (1)}$$

In a multi-beam environment, a plurality of SS blocks can be defined. Specifically, a plurality of SS blocks are defined, and each of the SS blocks can be transmitted in its unique DL transmission beam direction. In addition, a RACH resource may be configured per SS block. A UE may receive signals/channels in the SS blocks and select an SS block index with the best reception quality. In addition, the UE may select an RACH resource associated with the corresponding SS block index and transmit a PRACH preamble on the selected resource. In this case, the UE may select one or more SS block indices and attempt PRACH transmission on the RACH resource associated with each SS block.

If the UE fails to receive an RAR within a corresponding RAR window, the UE attempts the PRACH transmission again and repeat the above-described processes. It is called PRACH retransmission. Whenever performing the PRACH retransmission, the UE ramps up the PRACH transmission power by a certain degree. That is, the UE performs the retransmission according to the number of allowed PRACH retransmission rounds. Whenever performing the retransmission, the UE ramps up the power, but the ramped-up power cannot exceed the maximum transmission power. The number of times that PRACH retransmission can be performed is reflected in the variable PREAMBLE_TRANSMISSION_COUNTER of Equation (2) below, and the amount of ramped-up power is reflected in powerRampingStep. Eventually, the PRACH preamble transmission power of the LTE system is determined according to Equation (1) above and Equation (2) below.

$$\text{PREAMBLE\_RECEIVED\_TARGET\_POWER} = \text{preambleInitialReceivedTargetPower} + \text{DELTA\_PREAMBLE} + (\text{PREAMBLE\_TRANSMISSION\_COUNTER} - 1) * \text{powerRampingStep}. \quad \text{Equation (2)}$$

Before describing the transmission power for the PRACH preamble retransmission in the new RAT system, the PRACH retransmission needs to be defined. In particular, in a multi-beam environment, PRACH preamble repetition or beam sweeping may be considered according to TX/RX reciprocal capability of a TRP or UE. The TX/RX reciprocal capability could be referred to as TX/RX beam correspondence at the TRP and a UE. If the TRP and UE cannot maintain the TX/RX reciprocal capability in the multi-beam environment, the UE may be unable to transmit an uplink signal in the beam direction where the UE receives a downlink signal. This is because the UL optimal path may be different from the DL optimal path. If the TRP can determine a TRP RX beam for corresponding uplink reception based on UE's downlink measurements for one or more TX beams of the TRP and/or if the TRP can determine a TRP TX beam for corresponding downlink transmission based on TRP's uplink measurements for one or more RX beams of the TRP, the TX/RX beam correspondence at the TRP can be hold. Meanwhile, if the UE can determine a UE RX beam for corresponding uplink transmission based on UE's downlink measurements for one or more RX beams of the UE and/or if the UE can determine a UE TX beam for corresponding downlink reception based on an indication from the TRP, which is made based on uplink measurements for one or more TX beams of the UE, the TX/RX beam correspondence at the UE can be hold.

Figure 14:
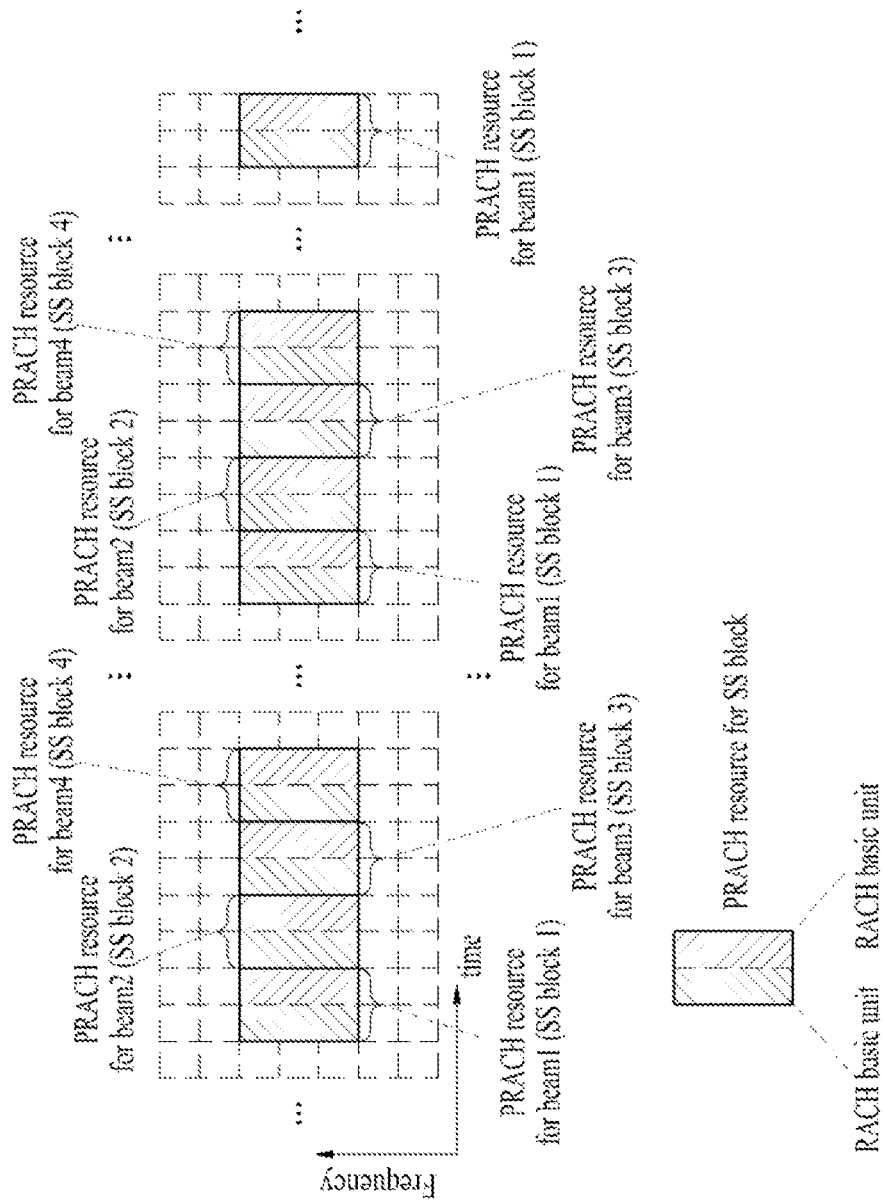
FIG. 14 illustrates physical random access channel (PRACH) transmission according to the present invention.
Figure 15:
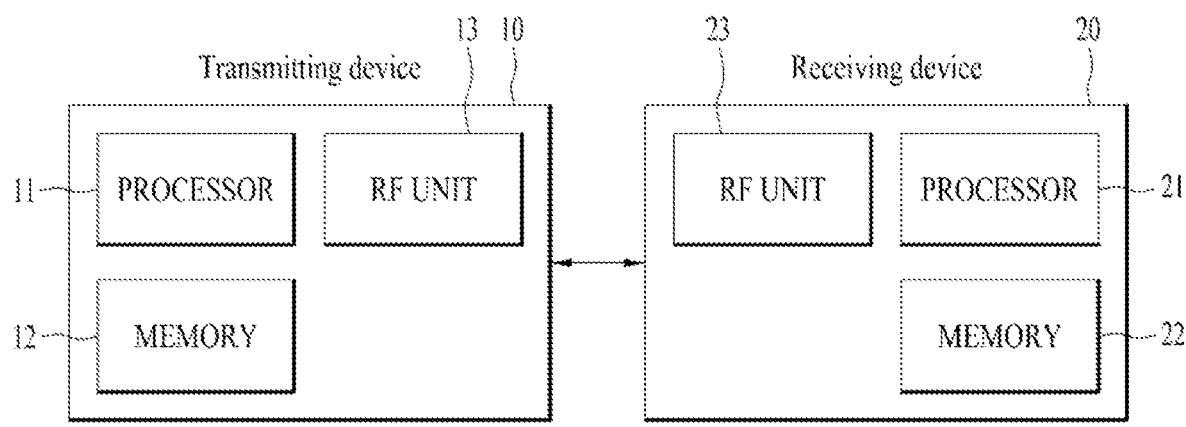
FIG. 15 is a block diagram illustrating elements of a transmitting device 10 and a receiving device 20 for implementing the present invention.

FIG. 14 illustrates PRACH transmission according to the present invention. Although FIG. 14 shows that PRACH resources for a set of beam directions applied to a cell/carrier are consecutive in the time domain, the PRACH resources can be arranged nonconsecutively. In addition, although FIG. 14 shows the PRACH resources for the set of beam directions available on the cell/carrier are the same in the frequency domain, different frequency resources may be configured.

An RACH resource can be defined per beam direction in which an SS is transmitted, or per SS block. At this time, the corresponding RACH resource may be sub-divided into RACH basic units. Here, the RACH basic unit can be defined as a time-frequency resource used for transmitting one PRACH preamble. For example, referring to FIG. 14, one PRACH resource configured for one beam direction or SS block can be segmented into two RACH basic units. Although FIG. 14 shows that one PRACH resource is segmented into two RACH basic units, the PRACH resource may be segmented into three or more RACH basic units.

One-time PRACH attempt may mean that a PRACH preamble is transmitted on a RACH resource defined per SS block. In addition, although preamble repetition or beam sweeping is performed on the corresponding RACH resource, it may be considered as one-time PRACH attempt. For example, even if a UE transmits RACH preambles on the same RACH resource by changing a beam direction according to RACH basic units, it may be considered as one-time PRACH attempt. In other words, if a plurality of PRACH preambles are transmitted using different RACH basic units on the same RACH resource, it is not considered as retransmission. For example, referring to FIG. 14, if a UE transmits RACH preambles on RACH basic units of a PRACH preamble resource for SS block 1 (in different directions), this may be considered as one-time RACH transmission attempt. Thus, when preambles are repeatedly transmitted on the same RACH resource or when the beam sweeping where transmission is performed by changing a beam direction is applied, transmission power may not increase per preamble transmission.

However, even in the case of RACH resources associated with the same beam or SS block, if an RACH preamble is transmitted on a next RACH resource (that is, when a UE stands by during an RAR window for RAR reception and then transmits an RACH preamble on an RACH resource after the RAR window) or if a PRACH preamble is transmitted on a PRACH resource associated with another beam/SS block, it is considered as retransmission. For example, referring to FIG. 14, if a UE does not receive an RAR for a RACH preamble transmitted on a PRACH preamble resource associated with SS block 1 or receives an RAR indicating beam switching, the UE may transmit a RACH preamble on a next PRACH preamble resource for SS block 1 or a PRACH preamble resource associated with another SS block. At this time, the RACH preamble transmission is considered different from the previous RACH preamble transmission. In this case, "PREAMBLE_TRANSMISSION_COUNTER" of Equation (2), which indicates how many times PRACH preamble retransmission is performed, increases. In other words, if the RACH preamble transmission using RACH resources for the same beam or SS block occurs in different PRACH opportunities, or if RACH preamble transmission uses RACH resources associated with different beams or SS blocks, a UE increase "PREAMBLE_TRANSMISSION_COUNTER".

The amount of ramped-up power may vary per beam index. The amount of power ramped up by a UE may be configured/signaled independently between beam indices, and the power increase for retransmission may be computed per beam index. However, the calculation of PREAMBLE_TRANSMISSION_COUNTER is performed by collecting all RACH resources even if different beam directions, i.e., different RACH resources are used. For example, PRACH transmission power is obtained by calculating how many times each UE performs PRACH preamble transmission instead of calculating how many times the PRACH preamble transmission is performed per RACH resource. This is because since RACH transmission fails even though power is ramped up by attempting the RACH transmission for beams with good quality, the delay of the RACH transmission increases if the power is set to the default value on the next RACH resource. However, since each beam direction, i.e., each SS block has a different RS reception level, path loss values may vary. Thus, when the UE performs the PRACH preamble retransmission, the UE compensates for the path loss of the PRACH preamble transmission power in each RACH resource used for the PRACH preamble transmission. For example, assuming that RACH resource j is associated with beam direction or SS block index j, PRACH transmission power PPRACH, J on RACH resource j can be defined by Equations (3) and (4).

$$P_{PRACH,j} = \min\{P_{CMAX,c}(i), \text{PREAMBLE\_RECEIVED\_TARGET\_POWER} + PL_{c,beam(j)}\} - [dBm]. \quad \text{Equation (3)}$$

where $P_{CMAX,c}(i)$ is the configured UE transmit power for subframe i of serving cell c and $PL_{c,beam(j)}$ is the downlink path loss estimate calculated in the UE for beam direction j (or SS block index j) of serving cell c.

PREAMBLE_RECEIVED_TARGET_POWER=preambleInitialReceivedTargetPower+DELTA PREAMBLE+
(PREAMBLE_TRANSMISSION_COUNTER−1)*powerRampingStep(j). Equation (4)

where, if powerRampingStep is configured RACH resource common, powerRampingStep(j) is powerRampingStep.

If preambleInitialReceivedTargetPower and preamble formats are configured per RACH resource (i.e., per beam direction or SS block index), preambleInitialReceivedTargetPower and DELTA_PREAMBLE can be respectively changed to preambleInitialReceivedTargetPower(j) and DELTA_PREAMBLE(j) in Equation 4.

When a UE attempts the PRACH preamble transmission using a plurality of RACH resources, the network can configure and signal the number of RACH resources that can be used by the UE. In addition, if the PRACH preamble transmission is allowed on two RACH resources, the network may configure offsets for received signal levels of the best and second best beams and then transmit the offsets by including them in a RACH configuration. When there are more than two RACH resources, offsets for received signal levels of the best, second best, third best beams are signaled. This may mean that the UE can attempt the PRACH preamble transmission with respect to beams only within the corresponding offsets as wells as the best beam.

* PRACH Retransmission, RACH Resource Selection Method, and/or Power Control

When a plurality of SS blocks are transmitted, a plurality of RACH resources can be allocated for a UE. Hereinafter, a method by which the UE selects a RACH resource for a random access procedure among the plurality of RACH resources will be described. In particular, the method for selecting a RACH resource for a random access procedure, i.e., RACH procedure will be described relating to a PRACH retransmission method.

>Alt a. Best Beam First—Based on Received Signal Level of SS Block

According to Alt a, when a UE performs PRACH transmission, if a plurality of SS blocks are received above a certain level, in other words, if the UE has multiple preferred beam indices, the UE first transmits a PRACH for an SS block with the highest received signal strength (i.e., the best beam index). If the UE does not receive an RAR for the corresponding PRACH within a given RAR window, the UE retransmits the PRACH for the corresponding beam index. In other words, the UE preferentially transmits a PRACH preamble on a RACH resource associated with the SS block index with the highest received signal strength, and when the retransmission is required, the UE preferentially attempts to transmit a PRACH preamble for the SS block index with the highest received signal strength. For convenience of description, it is assumed that a UE prefers three beam indices: beam indices a, b and c. In addition, it is also assumed that among the preferred beams, beam index a is the best beam and beam index c is the beam with the lowest quality. The numbers of retransmission rounds for beam indices a, b and c are denoted by Ra, Rb and Rc, respectively. If the UE does not receive an RAR for a PRACH for the best beam index after performing retransmission for the best beam index Ra times (where Ra≥1), the UE may attempt retransmission for the beam index with the second best quality Rb times (where Rb≥1). If the UE still does not receive any RAR in spite of attempting the PRACH retransmission Rb times, the UE may attempt retransmission for the beam index with the third best quality Rc times (where Rc≥1). In other words, the number of PRACH preamble retransmission rounds for each SS block may be independently defined or configured. The UE preferentially attempts to transmit a PRACH preamble for the SS block index with the highest received signal strength. And, if necessary, the UE attempts retransmission for the SS block index with the highest received signal strength as many times as possible within the maximum number of retransmission rounds. If the UE still does not receive any RAR from the network despite the retransmission attempts or if the UE does not completes the RACH procedure due to contention resolution failure even though the UE receive a RAR, the UE may attempt the PRACH transmission for the SS block with the second best received quality.

Whenever the UE performs PRACH retransmission, the UE ramps up power by a value (delta) signaled to the UE. That is, whenever a PRACH for beam index a is transmitted, power is ramped up. The PRACH for beam index a is retransmitted Ra times, and the power is ramped up every retransmission until the maximum power is reached. When the maximum power is reached, the retransmission for beam index a is performed with the maximum power. If the UE does not receive an RAR even though the UE retransmits the PRACH for beam index a Ra times, the UE transmits a PRACH for beam index b on a PRACH resource associated with beam index b. When the UE transmits the PRACH for the beam index b, the UE should reset or initialize the transmission power. That is, the maximum power used for the PRACH transmission for beam index a is not used. As if the PRACH was transmitted at the first time, the PRACH for beam index b is transmitted at the power used for the initial transmission. Thereafter, if the UE does not receive an RAR, the power is ramped up. Similarly, if the UE does not receive an RAR in spite of retransmitting the PRACH for beam index b Rb times, the UE transmits a PRACH for beam index c, which has the next best quality. When the UE attempts the PRACH preamble transmission by changing the current RACH resource, the UE may calculate the initial transmission power with respect to the received signal strength (e.g., RSRP) of the SS block associated with the corresponding RACH resource similar to the power control method described in Method 1. That is, when the UE performs the PRACH preamble retransmission, the PRACH preamble transmission power may compensate for the path loss in each RACH resource or SS block index used for the PRACH preamble transmission.

When the UE fails to receive any RAR for RRACHs, that is, when the UE doses not receive an RAR for its all preferred beams, the UE may report this fact to higher layers and then perform cell reselection operation. For example, unlike the power control method described in Method 1, in the case of RACH retransmission for different beam indices, the UE may attempt power ramping per beam index using a separate power ramping counter per beam index. That is, when the UE performs RACH preamble retransmission for a different beam index (i.e., SS block index), retransmission rounds are not counted unlike Method 1 where retransmission rounds are counted regardless of beam indices (i.e., SS block indices).

>Alt b. Beam Index Round Robin

According to Alt b, when a UE performs PRACH transmission, if a plurality of SS blocks are received above a certain signal strength level, in other words, if the UE has multiple preferred beam indices, the UE first transmits a PRACH for an SS block with the highest received signal strength (i.e., the best beam index). For example, when the UE has multiple preferred beam indices, the UE first transmits a PRACH for the best beam index. Thereafter, if the UE does not receive an RAR for the corresponding PRACH within a given RAR window, the UE transmits a PRACH for the beam index with the second best reception quality. If the UE does not receive an RAR for the corresponding PRACH in the RAR window, the UE transmits a PRACH for the beam index with the third best reception quality. In other words, when a UE has a plurality of SS block indices, each of which having received signal quality above a certain level, the UE may perform PRACH preamble retransmission by sequentially selecting RACH preamble transmission for the plurality of SS block indices according to the SS block reception quality. However, if a UE performs PRACH preamble transmission with respect to a number of RACH resources, it may degrade the system performance due to the ping-pong effect. Hence, restrictions may be imposed on the number of PRACH resources where a UE can attempt the PRACH preamble transmission and the reception quality range of associated SS blocks. For example, a network may signal the maximum number of SS blocks where a UE makes RACH attempts or the number of RACH resources, an offset value from the received signal strength of the best SS block, etc. via a PRACH configuration. The offset may be used to allow the RACH preamble transmission only for SS block indices within a certain range from the received signal strength of the best SS block.

When a UE does not receive an RAR after transmitting a PRACH for a specific beam index, the UE may transmit a PRACH based on the second best quality. In this case, the UE may consider it as PRACH retransmission and then ramp up the power. However, since although it is considered as the PRACH retransmission from the perspective of the UE, the corresponding transmission is PRACH transmission for another beam index, it is preferred not to ramp up the power. Thus, when the UE transmits individual PRACHs for a set of the preferred beam indices, if the UE transmits the PRACH for the specific beam index for the first time, the UE does not ramp up the power. In addition, if the UE does not receive an RAR after attempting the PRACH transmission one time for all beam indices, the UE transmits the PRACH for the best beam index again by ramping up the power. In performing power ramping-up, the UE may attempt the power ramping-up per beam index by separately using a power ramping counter per SS block index (or beam index) as mentioned in Alt a. However, since each beam direction, i.e., each SS block has a different reception level, path loss values may vary. Thus, when the UE performs the PRACH preamble retransmission, the UE may compensate for the path loss in each RACH resource or SS block index used for the corresponding PRACH preamble transmission using the corresponding PRACH preamble transmission power. For convenience of description, it is assumed that a UE prefers three beam indices: beam indices a, b and c. In addition, it is also assumed that among the preferred beams, beam index a is the best beam and beam index c is the beam with the lowest quality. The numbers of retransmission rounds for beam indices a, b and c are denoted by Ra, Rb and Rc, respectively. If the UE does not receive an RAR after transmitting a PRACH for beam index a, the UE transmits a PRACH for beam index b. If the UE receive no RAR for the PRACH for beam index b, the UE transmits a PRACH for beam index c. If the UE does not receive any RAR for all the beam indices, the UE transmits the PRACH for beam index a again by ramping up the power. If the UE still does not receive an RAR for the PRACH for beam index a, the UE transmits the PRACH for beam index b, which is the next beam index, with the ramped up power, that is the power that is previously used for transmitting the PRACH for beam index a. Similarly, if the UE does not receive an RAR for the PRACH for the beam index b, the UE transmits the PRACH for beam index c with the same power. That is, the UE can perform the PRACH retransmission for each beam index by ramping up the power as described above. As another method for setting PRACH preamble transmission power, when a UE performs retransmission on the same RACH resource, i.e., the RACH resource associated with the same beam or SS block, the UE may ramp up the power. And, when the UE changes the RACH resource, the UE may use the previous power as it is without resetting or initializing the PRACH transmission power. That is, when the UE performs the retransmission on the same RACH resource, the UE may ramp up the power. On the contrary, when the UE performs the retransmission by changing the RACH resource, the UE may maintain the previous PRACH preamble transmission power.

>Alt c. Multiple PRACH Preamble Transmission Scheme

According to Alt c, if a UE receives a plurality of SS blocks above a certain signal strength level, in other words, if the UE has multiple preferred beam indices, the UE can transmit PRACH preambles for the plurality of SS blocks. That is, if the UE does not receive an RAR for any one of the beam indices after transmitting respective PRACHs for the plurality of beam indices, the UE may attempt the PRACH transmission again. For example, after respectively transmitting PRACHs for beam indices a, b and c, the UE may wait for RARs for the transmitted PRACHs in the same window or overlapping windows. That is, even though the UE does not receive an RAR for a specific beam index, the UE may transmit a PRACH for another beam index. When the UE receives no RAR for beam indices a, b, and c, the UE may retransmits the PRACHs for beam indices a, b and c. In this case, the UE ramps up and transmits the PRACH for each of the beam indices.

The UE may transmit a plurality of PRACHs without waiting for RAR reception. However, if PRACHs are for the same beam index, the UE cannot perform the PRACH transmission until receiving an RAR, that is, before reaching a new RAR transmission window. In other words, only when PRACHs are for different beam indices, the UE can perform the PRACH transmission without waiting for the RAR reception.

Although it is described that a UE can attempt PRACH transmission by rotating beam indices in a round robin manner, the UE may determine the PRACH transmission order and the number of PRACH transmission rounds when performing the round robin rotation for the beam indices. Preferably, the best beam index starts first. When a specific beam index has channel quality above a certain threshold, if the reception quality of the specific beam index is significantly different from that of another beam index, the UE may attempt PRACH transmission for the beam index with the better quality more frequently. For example, the UE may attempt RACH transmission in the form of [a, b, a, b, c, a, b, a, b, c, . . . ] rather than [a, b, c, a, b, c, . . . ]. In this case, the power ramping principle can be established such that in the case of retransmission for the same beam index, power is ramped up, and for different beam indices, power is ramped up by the number of retransmission rounds for a corresponding beam index.

Among candidate resources where power ramping-up will be applied, the first available PRACH resource is the first available resource among available RACH resources or the resource capable of reducing the total delay maximally. As another method, the RACH resource corresponding to the beam with a largest amount of resources may be selected as the first available PRACH resource, or an RACH resource may be selected as the first available PRACH resource by considering loads and the like as described above.

* Maximum PRACH Transmission Number

The maximum number of times that a UE can perform PRACH (re)transmission should be defined. When a UE transmits PRACHs for a plurality of beam indices, the maximum retransmission number can be mainly defined according to the following two method.

>Method 1. The maximum (re)transmission number R can be designated per UE. In this case, the condition of R=Ra+Rb+Rc may be established in the above-described example. That is, the maximum PRACH retransmission number is defined and signaled per UE, and this value may be the sum of the maximum retransmission number per beam index. The maximum retransmission number per beam index may be the same or different. An eNB or UE may increase the number of PRACH retransmission rounds for the best beam index. For example, in the above example, Ra>Rb>Rc. Alternatively, Ra=Rb=Rc. The both cases should satisfy the condition of Ra+Rb+Rc=R.

>Method 2. The maximum retransmission number R can be designated per beam index. In this case, the condition of R=Ra=Rb=Rc may be established in the above-described example. That is, when the number of times that a UE can perform PRACH retransmission per beam index is defined and signaled and when the same number of PRACH retransmission rounds is set per beam index, it can be signaled as a single value. However, considering the fact that a PRACH configuration is set per beam index, if the maximum retransmission number is set per beam index, it is desirable that the corresponding value is signaled per beam index. In this case, Ra≠Rb≠Rc, and thus Ra, Rb, and Rc are respectively signaled. A UE performs PRACH retransmission as many times as specified by the maximum retransmission number for a specific beam index and then attempts PRACH transmission for another beam index. Even if the maximum retransmission number is defined per beam index, the UE may autonomously determine the maximum retransmission number per beam index. That is, even if the maximum retransmission number of beam index a is set to Ra, the UE may perform PRACH retransmission Rx times (where Rx<Ra).

When a UE transmits PRACHs for a plurality of beam indices, if the number of desired beam indices is too high, the corresponding UE should perform PRACH transmission too many times, and thus the UE may waste too many resources. Therefore, the maximum PRACH transmission number per UE, Rmax may be signaled. In this case, Rmax may satisfy the condition of Rmax=<Ra+Rb+Rc.

* PRACH Resource Configuration Depending on UE Coverage

Configuring PRACH resources per beam may cause resource waste. When a UE is relatively far away from an eNB, the UE may require beamforming. For this UE, it is desirable to configure PRACH resources per beam index, but in the case of UEs located at the cell center, the eNB does not need to perform RX beamforming. Thus, according to UE coverage classes, PRACH resources can be differently configured. A UE may transmit a PRACH on common PRACH resources, and the eNB may be configured not to perform the RX beamforming on the corresponding resources. Since the corresponding resource region is not limited to a specific beam direction, it is possible to avoid resource waste. If UEs are located at the cell center, the UEs may have almost no propagation loss or blockage. Such UEs, i.e., UEs with excellent channel states may be configured to perform PRACH transmission on resources where omni-direction reception is possible. For the corresponding UEs, common PRACH resources can be separately allocated. The UEs may repeatedly transmit PRACHs on the common PRACH resources regardless of beam indices.

If a UE is relatively far away from the eNB or requires the beamforming, the UE may transmit a PRACH per beam index using beam-index-specific PRACH resources according to the aforementioned methods.

Referring to the aforementioned sequential PRACH transmission method again, a UE transmits a PRACH for the best beam index. And, if no RAR is transmitted within a given window, the UE attempts the PRACH transmission for the corresponding beam index again. The UE may attempt the retransmission x times (where x≥1). If the UE fails to receive an RAR after performing the retransmission x times, the UE transmits a PRACH for the beam index with the second best quality and then waits to receive an RAR within the given window. Similarly, if the UE receives no RAR for the corresponding PRACH, the UE may perform PRACH retransmission for the corresponding beam index y times (where y≥1). If the UE still does not receive any RAR after performing the PRACH retransmission y times, the UE may attempt PRACH transmission for the beam index with the third best quality. The number of times that the UE attempts the PRACH transmission may be the same per beam index (i.e., x=y). Alternatively, the number of times that the UE attempts the PRACH transmission may be different per beam index, and in this case, if a specific beam index has better reception quality, the number of PRACH attempts for the specific beam index may increase.

\* RACH Message 3 Transmission

After transmitting a PRACH for a specific beam index, a UE may receive an RAR for the corresponding PRACH. In this case, the UE may transmit its C-RNTI and a set of preferred beam indices (e.g., SS block indices) if possible. After receiving the report about the beam indices, an eNB may select a specific beam index from the corresponding beam index set and transmit the selected beam index when scheduling the corresponding UE.

For example, PRACH Message 3 may contain the index of one preferred beam, which is obtained by a UE through downlink beam RS measurement or N beam indices (where N is a random integer greater than 1) and the received signal strength for the corresponding beam indices (e.g., RSRSP).

\* RACH Message 4 Transmission

Upon receiving RACH Message 3 from a UE, an eNB transmits RACH Message 4 to the corresponding UE. Generally, RACH Message 4 is transmitted for contention resolution. However, according to the present invention, based on best N beam indices (beam information) reported by a UE, an eNB signals a beam index to be used for data transmission to the corresponding UE in RACH Message 4. In this case, the eNB can signal one or more beam indices. By doing so, the UE expect that its PDCCH/PDSCH will be transmitted in the direction corresponding to the signaled beam index and may perform RX beamforming in the corresponding direction. Similarly, when the UE transmits a PUSCH, the UE may perform uplink transmission such as PUSCH/PUCCH in the direction corresponding to the signaled beam index.

\* Beam Index Update

A UE may report its preferred beam indices as follows. The following methods can also be used when UE's preferred beam directions are changed/added.

>Method 1: When obtaining PRACH resource information per beam index, a UE transmits a PRACH on a PRACH resource per beam index. By doing so, the UE may informs an eNB that the channel quality of the corresponding beam index is good.

>Method 2: A UE may perform RSRP measurement by measuring an RS per beam index. In this case, a Beam RS (BRS), which is transmitted through wideband or a PBCH-RS, which is used for PBCH demodulation, may be used as a reference RS for performing the RSRP measurement. Alternatively, RSRQ measurement may be performed with reference to the received signal strength of PSS/SSS.

FIG. 11 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

According to the present invention, the eNB processor may control the eNB RF unit to transmit a synchronization signal, a broadcast signal, and system information in accordance with any one of the proposals of the present invention. In addition, the eNB processor may control the eNB RF unit to receive a RACH from the UE in accordance with any one of the proposals of the present invention. Moreover, the eNB processor may control the eNB RF unit to transmit PDCCH/PDSCH in accordance with the proposals of the present invention. Further, the eNB processor may control the eNB RF unit to receive PUSCH/PUCCH in accordance with the proposals of the present invention.

According to the present invention, the UE processor may control the UE RF unit to receive a synchronization signal, a broadcast signal, and system information in accordance with any one of the proposals of the present invention. In addition, the UE processor may control the UE RF unit to transmit a RACH in accordance with any one of the proposals of the present invention. Moreover, the UE processor may control the UE RF unit to receive PDCCH/PDSCH in accordance with the proposals of the present invention. Further, the UE processor may control the UE RF unit to transmit PUSCH/PUCCH in accordance with the proposals of the present invention.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

The examples of the present invention are applicable to a BS, a UE, or other devices in a wireless communication system.

What is claimed is:

1. A communication device comprising:
    at least one transceiver;
    at least one processor; and
    at least one computer memory storing computer-readable instructions that cause the at least one processor to perform operations comprising:
    receiving a synchronization signal among a plurality of synchronization signals transmitted from a cell;
    receiving configuration information regarding a plurality of random access channel resources for the cell; and
    transmitting a random access preamble to the cell based on receiving the synchronization signal,
    wherein each of the plurality of synchronization signals is related to a different downlink beam among a plurality of downlink beams for the cell,
    wherein each of the plurality of random access channel resources is related to at least one of the plurality of synchronization signals, and
    wherein the random access preamble is transmitted on a random access channel resource, among the plurality of random access channel resources, which is related to the synchronization signal.

2. The communication device according to claim 1, wherein the configuration information is included in system information.

3. The communication device according to claim 1, wherein the plurality of synchronization signals are distinguished by different indices other than a frame index, a subframe index and a symbol index.

4. The communication device according to claim 3, wherein the operations further comprise:
    receiving a random access response associated with the random access preamble; and
    performing downlink channel reception or uplink channel transmission based on an index informed by the random access response among the different indices.

5. A method of transmitting a random access preamble by a communication device, the method comprising:
    receiving a synchronization signal among a plurality of synchronization signals transmitted from a cell;
    receiving configuration information regarding a plurality of random access channel resources for the cell; and
    transmitting the random access preamble to the cell based on receiving the synchronization signal,
    wherein each of the plurality of synchronization signals is related to a different downlink beam among a plurality of downlink beams for the cell,
    wherein each of the plurality of random access channel resources is related to at least one of the plurality of synchronization signals, and
    wherein the random access preamble is transmitted on a random access channel resource, among the plurality of random access channel resources, which is related to the synchronization signal.

6. The method according to claim 5, wherein the configuration information is included in system information.

7. The method according to claim 5, wherein the plurality of synchronization signals are distinguished by different indices other than a frame index, a subframe index and a symbol index.

8. The method according to claim 7, further comprising:
receiving a random access response associated with the random access preamble; and
performing downlink channel reception or uplink channel transmission based on an index informed by the random access response among the different indices.

9. A base station comprising:
at least one transceiver;
at least one processor; and
at least one computer memory storing computer-readable instructions that cause the at least one processor to perform operations comprising:
transmitting a plurality of synchronization signals to a cell;
transmitting configuration information regarding a plurality of random access channel resources for the cell; and
receiving a random access preamble from a communication device,
wherein each of the plurality of synchronization signals is related to a different downlink beam among a plurality of downlink beams for the cell,
wherein each of the plurality of random access channel resources is related to at least one of the plurality of synchronization signals, and
wherein the random access preamble is received on one among the plurality of random access channel resources.

10. The base station according to claim 9,
wherein the configuration information is included in system information.

11. The base station according to claim 9,
wherein the plurality of synchronization signals are distinguished by different indices, other than a frame index, a subframe index and a symbol index.

12. The base station according to claim 11, wherein the operations further comprise:
transmitting a random access response including index information regarding one among the different indices based on receiving the random access preamble; and
performing downlink channel transmission or uplink channel reception based on the index information.

13. A method of receiving a random access preamble by a base station, the method comprising:
transmitting a plurality of synchronization signals to a cell;
transmitting configuration information regarding a plurality of random access channel resources for the cell; and
receiving the random access preamble from a communication device,
wherein each of the plurality of synchronization signals is related to a different downlink beam among a plurality of downlink beams for the cell,
wherein each of the plurality of random access channel resources is related to at least one of the plurality of synchronization signals, and
wherein the random access preamble is received on one among the plurality of random access channel resources.

14. The method according to claim 13,
wherein the configuration information is included in system information.

15. The method according to claim 13,
wherein the plurality of synchronization signals are distinguished by different indices, other than a frame index, a subframe index and a symbol index.

16. The method according to claim 15, further comprising:
transmitting a random access response including index information regarding one among the different indices based on receiving the random access preamble; and
performing downlink channel transmission or uplink channel reception based on the index information.

\* \* \* \* \*